(12) United States Patent
Cucerzan et al.

(10) Patent No.: US 7,818,315 B2
(45) Date of Patent: Oct. 19, 2010

(54) RE-RANKING SEARCH RESULTS BASED ON QUERY LOG

(75) Inventors: Silviu-Petru Cucerzan, Redmond, WA (US); Ziming Zhuang, State College, PA (US)

(73) Assignee: Microsoft Corporation, Redmond, WA (US)

( * ) Notice: Subject to any disclaimer, the term of this patent is extended or adjusted under 35 U.S.C. 154(b) by 434 days.

(21) Appl. No.: 11/374,361

(22) Filed: Mar. 13, 2006

(65) Prior Publication Data

US 2007/0214131 A1    Sep. 13, 2007

(51) Int. Cl.
G06F 7/00 (2006.01)
G06F 17/30 (2006.01)

(52) U.S. Cl. .................. 707/723; 707/765

(58) Field of Classification Search .......... None
See application file for complete search history.

(56) References Cited

U.S. PATENT DOCUMENTS

| | | | | |
|---|---|---|---|---|
| 6,327,590 | B1* | 12/2001 | Chidlovskii et al. | 707/5 |
| 6,687,696 | B2* | 2/2004 | Hofmann et al. | 707/6 |
| 7,249,126 | B1* | 7/2007 | Ginsburg et al. | 707/3 |
| 2005/0102282 | A1* | 5/2005 | Linden | 707/3 |
| 2005/0246328 | A1* | 11/2005 | Zhang et al. | 707/3 |
| 2006/0047643 | A1* | 3/2006 | Chaman | 707/3 |
| 2006/0089926 | A1* | 4/2006 | Knepper et al. | 707/3 |
| 2006/0206476 | A1* | 9/2006 | Kapur et al. | 707/5 |
| 2008/0154878 | A1* | 6/2008 | Rose et al. | 707/5 |

OTHER PUBLICATIONS

Carbonell et al., "The Use of MMR, Diversity-Based Reranking for Reordering Documents and Producing Summaries," ACM, 1998.*
Huang et al., "Relevant Term Suggestion in Interactive Web Search Based on Contextual Information in Query Session Logs," Wiley Periodicals, Inc., 2003.*
Pitkow et al, "Personalized Search," Communications of the ACM, 2002.*
Kurland et al., "PageRank without Hyperlinks: Structural Re-Ranking using Links Induced by Language Models," ACM 2005.*
Ogilvie et al., "Language Models and Structured Document Retrieval," CiteSeer, 2003.*
Pew Internet Report, Pew Internet & American Life Project, "The Strength of Internet Ties," Jan. 25, 2006. Available at: http://www.pewinternet.org/pdfs/PIP_Internet_ties.pdf, last accessed Feb. 25, 2006, 65 pages.
Jansen, J., et al., A., "An Analysis of Web Documents Retrieved and Viewed," in Proceedings of the 4th International Conference on Internet Computing, Las Vegas, Nevada, Jun. 23-26, 2003, 5 pages.

(Continued)

*Primary Examiner*—Pierre M Vital
*Assistant Examiner*—Rachel J Lee
(74) *Attorney, Agent, or Firm*—Lee & Hayes, PLLC

(57) ABSTRACT

A system(s) and/or method(s) that facilitate improving the relevance of search results through utilization of a query log. The relevance of the search results for a target query can be judged based on one or more queries in the log that are related to the target query temporally and/or lexically. The diversity of the top-ranked search results can be increased and/or decreased based on an iterative re-ranking process of the search result set.

16 Claims, 14 Drawing Sheets

OTHER PUBLICATIONS

Olsen, S., "Does Search Engine's Power Threaten Web's Independence?" CNET News.com, Oct. 31, 2002. Available at: http://news.com.com/2009-1023-963618.html, last accessed Feb. 25, 2006, 4 pages.

Page, L. et al., "The PageRank Citation Ranking: Bringing Order to the Web," Technical Report, Stanford University Database Group, Jan. 29, 1998. Available at: http://dbpubs.stanford.edu:8090/pub/1999-66, last accessed Feb. 25, 2006, 17 pages.

Kleinberg, J., "Authoritative Sources in a Hyperlinked Environment," in Proceedings of the 9th ACM-SIAM Symposium on Discrete Algorithms, San Francisco, California, 1998, 29 pages.

Bharat, K., et al., "When Experts Agree; Using Non-Affiliated Experts to Tank Popular Topics," in Proceedings of the 10th International World Wide Web Conference (WWW10), Hong Kong, China, May 1-5, 2001, 6 pages.

Haveliwala, T., "Topic-Sensitive PageRank," in Proceedings of the 11th International World Wide Web Conference (WWW2002), Honolulu, Hawaii, May 7-11, 2002, 10 pages.

Shashua, A., et al., "Ranking with Large Margin Principle: Two Approaches," in Proceedings of the Neural Information Processing Systems (NIPS) Conference, Vancouver, Canada, Dec. 9-14, 2002, 8 pages.

Freund, Y. et al., "An Efficient Boosting Algorithm for Combining Preferences," Journal of Machine Learning Research, 2003, vol. 4, pp. 933-969, 37 pages.

Burges, C. et al., "Learning to Rank Using Gradient Descent," in Proceedings of the 22nd International Conference on Machine Learning (ICML 2005), Bonn, Germany, Aug. 7-11, 2005, 8 pages.

Deerwester, S. et al., "Indexing by Latent Semantic Analysis," Journal of American Society of Information Sciences, 1990, vol. 41(6), pp. 391-407, 34 pages.

Qiu, Y., et al., "Concept-Based Query Expansion," in Proceedings of the 16th Annual International ACM SIGIR Conference on Research and Development in Information Retrieval, Pittsburgh, Pennsylvania, Jun. 27-Jul. 1, 1993, 10 pages.

Mitra, M. et al., "Improving Automatic Query Expansion," in Proceedings of the 21st International ACM SIGIR Conference on Research and Development in Information Retrieval, Melbourne, Australia, Aug. 24-28, 1998, 9 pages.

Cui, H. et al., "Probabilistic Query Expansion Using Query Logs," in Proceedings of the 11th International World Wide Web Conference (WWW2002), Honolulu, Hawaii, May 7-11, 2002, 8 pages.

Kraft, R., et al., Mining Anchor Text for Query Refinement: in Proceedings of the 13th International World Wide Web Conference (WWW2004), New York, New York, May 17-22, 2004, 9 pages.

Salton, G., et al., "Improving Retrieval Performance by Relevance Feedback," Journal of the American Society for information Science, 1990, vol. 41, 10 pages.

Fu, X. et al., "Mining Navigation History for Recommendation," in Proceedings of the 5th International Conference on Intelligent User Interfaces, New Orleans, Louisiana, Jan. 9-12, 2000, 7 pages.

Joachims, T., "Optimizing Search Engines Using Clickthrough Data," in Proceedings of the 8th ACM SIGKDD International Conference on Knowledge Discovery and Data Mining, Edmonton, Alberta, Canada, Jul. 23-26, 2002, 10 pages.

Sugiyama, K. et al., "Adaptive Web Search Based on User Profile Constructed Without Any Effort From Users," in Proceedings of the 13th International World Wide Web Conference (WWW2004), New York, New York, May 17-22, 2004, 10 pages.

Zhuang, Z., "iHITS: Extending HITS for Personal Interests Profiling," in Proceedings of the 19th IEEE International Conference on Advanced Information Networking and Applications (AINA 2005), International Workshop on Web and Mobile Information Systems, Taiwan, Mar. 28-30, 2005, vol. 2, 5 pages.

Shen, X., et al., "Exploiting Query History for Document Ranking in Interactive Information Retrieval," in Proceedings of the 26th Annual International ACM SIGIR Conference on Research and Development in Information Retrieval, Toronto, Canada, Jul. 28-Aug. 1, 2003, 2 pages.

Nambiar, U., et al., "Providing Ranked Relevant Results for Web Database Queries," in Proceedings of the 13th International World Wide Web Conference (WWW2004), New York, New York, May 17-22, 2004, 2 pages.

Koenemann, J., et al. "A Case for Interaction: A Study of Interactive Information Retrieval Behavior and Effectiveness," in Proceedings of the SIGCHI Conference on Human Factors in Computing Systems, Vancouver, Canada, Apr. 13-18, 1996, 8 pages.

Lau, T., et al., "Patterns of Search: Analyzing and Modeling Web Query Refinement," in Proceedings of the 7th International Conference on User Modeling (UM'99), Banff, Canada, Jun. 20-24, 1999, 10 pages.

Dumais, S. et al., "Optimizing Search by Showing Results in Context," in Proceedings of the SIGCHI Conference on Human Factors in Computing Systems, Seattle, Washington, Mar. 31-Apr. 5, 2001, 8 pages.

Jarvelin, K., et al., "IR Evaluation Methods for Retrieving Highly Relevant Documents," in Proceedings of the 23rd Annual International ACM SIGIR Conference Research and Development on Information Retrieval, Athens, Greece, Jul. 24-28, 2000, 9 pages.

Jarvelin, K., e tal., "Cumulated Gain-Based Evaluation of IR Techniques," ACM Transactions on Information Systems, 2002, vol. 20, No. 4, 29 pages.

Kang, I., et al., "Query Type Classification for Web Document Retrieval," in Proceedings of the 26th Annual International ACM SIGIR Conference on Research and Development in Information Retrieval, Toronto, Canada, Jul. 28-Aug. 1, 2003, 8 pages.

Rose, D., et al., "Understanding User Goals in Web Search," in Proceedings of the 13th International World Wide Web Conference (WWW2004), New York, New York, May 17-22, 2004, 7 pages.

Lee, U. et al., "Automatic Identification of User Goals in Web Search," in Proceedings of the 14th International World Wide Web Conference (WWW2005), Chba, Japan, May 10-14, 2005, 10 pages.

Teevan, J. et al., "Personalizing Search via Automated Analysis of Interests and Activities." in Proceedings of the 28th Annual International ACM SIGIR Conference on Research and Development in Information Retrieval, Salvador, Brazil, Aug. 15-19, 2005, 8 pages.

Salton, G.; Deveolpments in Automatic Text Retrieval; Aug. 30, 1991; 8 pages.

* cited by examiner

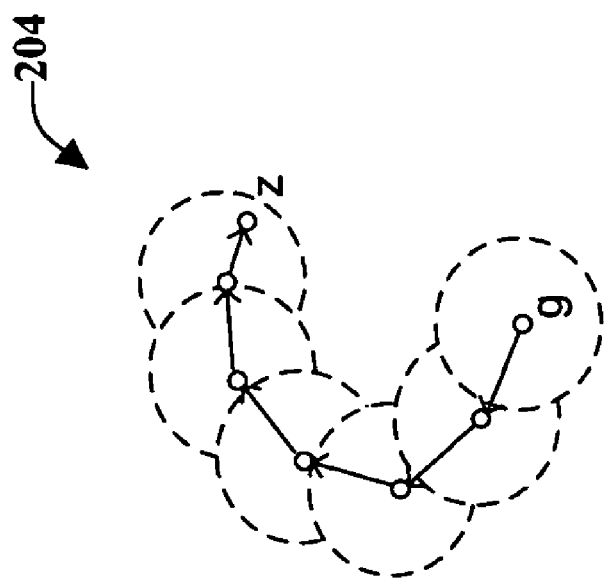
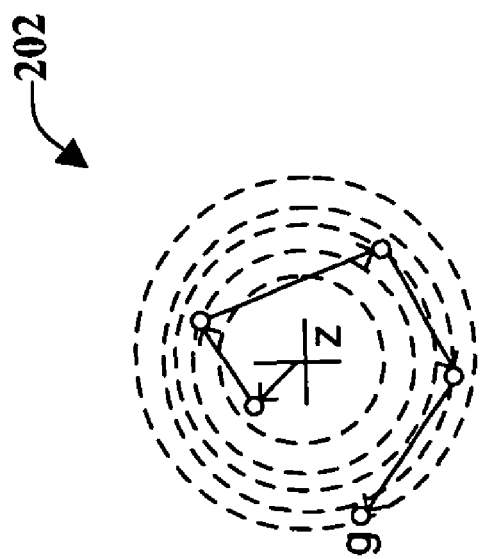
FIG. 2

RE-RANKING SEARCH RESULTS BASED ON QUERY LOG

BACKGROUND

The Internet has provided users with a mechanism for publishing and/or obtaining information regarding any subject matter. For example, various web sites are dedicated to posting text, images, and video relating to world, national, and/or local news. Typically, the information available on Web sites and servers can be accessed utilizing a Web browser that executes on a computer. A user can launch a Web browser and access a Web site by entering a Uniform Resource Locator (URL) of the Web site into an address bar of the Web browser and pressing the enter key on a keyboard or clicking a button with a mouse. This scenario presumes the user knows the URL of the Web-site that contains the information relevant to the user's needs. However, in many instances, the user does not know the URL of the Web-site and may not even know whether such a site exists. In such cases, the user typically employs a search engine to locate a site that provides the user desired information by sending to the search engine a query the user believes is relevant for finding the information.

Using a stored index of the World Wide Web the search engine finds Web documents that match the user's query, ranks the documents based on measures of how good the match is (such as term frequency, inverse document frequency, and term proximity) in conjunction with measures of Web-site/document popularity, and returns the ordered list to the user. The user can then select one of the web documents returned by the search engine to review the content therein.

Often, however, users have difficulty formulating a query that would steer the search engine to return documents relative to the user's needs. In such cases, the search engine will return a substantial number of sites that are unrelated to the particular interests of the user. For example, if a user searching for information related to biological viruses submits the keyword "virus" as a query to a Web search engine the user may receive information relating to biological viruses as well as computer viruses. The user can thereafter scroll through a plurality of returned sites in an attempt to determine if the sites are related to the interests of the user. Scrolling through returned results can be extremely time-consuming and frustrating to the user as general search engines can return a substantial number of sites when performing a search. The user can attempt to narrow the search by adding words such as "biological" or "health" to the query, but this action may discard very relevant sites that simply do not contain the particular words added to the query. Alternatively, the user may attempt structuring a query, such as by using a combination of Boolean operators, but it can be difficult to construct an appropriate Boolean search that will result in a return of sites containing relevant information.

Some search engines attempt to infer what a user is searching for based upon the set of possible semantic senses of keywords. For example, if a user entered the term "virus" into the general search engine, the search engine can return a plurality of sites together with suggestions for narrowing the search. More particularly, the search engine could return a plurality of suggestions, such as "do you want to search for a computer virus?" or "do you want to search for a biological virus?" For many searches (especially for more detailed and specific searches), this method requires selecting a continuing hierarchy of suggested searches and the returned sites may still lack relevant information. Furthermore, the user may desire to locate a site that will not be encompassed by the returned search suggestions.

Other search engines may attempt to match the user's search intents through a query expansion technique by determining terms to be added to the query (such as synonyms of the query terms) in order to construct new queries to be sent to be processed by the search engine instead of or in addition to the original query. However, query expansion techniques have several disadvantages. For example, if the original user query is dismissed or determined incorrectly by search engine to be not relevant, the search results might not include some information related to the user's search intent. Alternatively, the number of queries that the search engine has to handle is vastly increased and mediation between the various expansions is necessary.

Furthermore, users desire the ability to search for information based on what they personally find relevant. Some technologies permit users to input data to create a user profile that is employed to provide more relevant search results. However, users are often too busy to take the time to provide lengthy information criteria in order to facilitate the search process. They demand quick and efficient means to return search results that best suit their own needs, thereby increasing their satisfaction with their searches.

Thus, a difficulty of web searching includes increasing the relevance of the results returned by a search engine. User queries may have different degrees of ambiguity, from queries that are apparently unambiguous (e.g., "Safeco field zip code") to queries that are extremely ambiguous in the absence of other information about the user's intent (e.g., "cat", which can refer to the domestic animal, a wild animal, a singer, a construction company, or can represent the acronym of tens of other concepts). Especially for highly ambiguous queries, for which a very large number of web pages contain the queried terms, the absolute relevance of web pages or web sites (such as page rank) may not be indicative of how relevant those pages or sites are for such queries.

To overcome the foregoing as well as other difficulties, what is needed is a technique for re-ranking the top search results returned by a search engine based on the user's real needs when querying a search engine rather than their queries, which can be regarded as superficial forms of their needs. What is also needed is a technique for allowing a user to bias the search engine to increase and/or decrease the diversity of the top results and/or increase and/or decrease the number of results that address the informational needs of the majority of users in conjunction with a query.

SUMMARY

The following presents a simplified summary of one or more embodiments in order to provide a basic understanding of some aspects of such embodiments. This summary is not an extensive overview of the one or more embodiments, and is intended to neither identify key or critical elements of the embodiments nor delineate the scope of such embodiments. Its sole purpose is to present some concepts of the described embodiments in a simplified form as a prelude to the more detailed description that is presented later.

In accordance with one or more embodiments and corresponding disclosure thereof, various aspects are described in connection with re-ranking the top search results returned by a search engine through utilization of query log information. Techniques are provided to leverage information obtained implicitly from the users of a search engine. Such information can be represented by the frequency of various queries and the distribution of queries submitted by users in a search session in which such users queried for a particular concept, term, or series of terms or concepts.

Provided are techniques that can re-rank the top search results returned by a search engine through utilization of query log information. The relevance of the search results can be based on one or more queries received that are related to a target query temporally and/or lexically. The diversity of the search results can be increased and/or decreased based on an iterative process that builds the search result set to be output.

To the accomplishment of the foregoing and related ends, one or more embodiments comprise the features hereinafter fully described and particularly pointed out in the claims. The following description and the annexed drawings set forth in detail certain illustrative aspects and are indicative of but a few of the various ways in which the principles of the embodiments may be employed. Other advantages and novel features will become apparent from the following detailed description when considered in conjunction with the drawings and the disclosed embodiments are intended to include all such aspects and their equivalents.

BRIEF DESCRIPTION OF THE DRAWINGS

FIG. 2 illustrates exemplary user behaviors in a search space.

DETAILED DESCRIPTION

Figure 1:
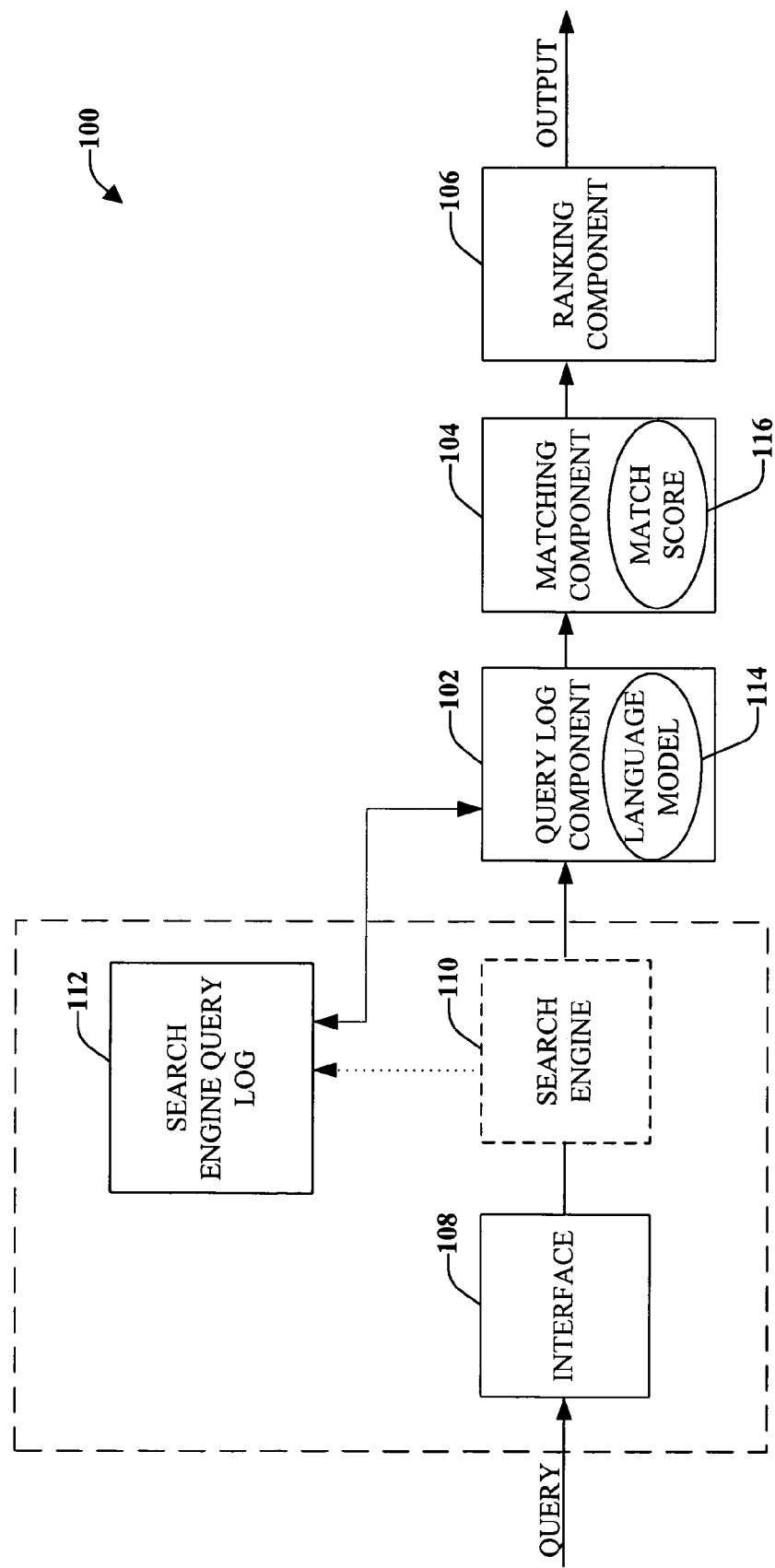
FIG. 1 illustrates a system for re-ranking search results retrieved by a search engine based on query log statistics.

Various embodiments are now described with reference to the drawings, wherein like reference numerals are used to refer to like elements throughout. In the following description, for purposes of explanation, numerous specific details are set forth in order to provide a thorough understanding of one or more aspects. It may be evident, however, that the various embodiments may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers.

The word "exemplary" is used herein to mean serving as an example, instance, or illustration. Any aspect or design described herein as "exemplary" is not necessarily to be construed as preferred or advantageous over other aspects or designs.

Furthermore, the one or more embodiments may be implemented as a method, apparatus, or article of manufacture using standard programming and/or engineering techniques to produce software, firmware, hardware, or any combination thereof to control a computer to implement the disclosed embodiments. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Additionally it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed embodiments.

As used herein, the term "inference" refers generally to the process of reasoning about or inferring states of the system, environment, and/or user from a set of observations as captured through events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines . . . ) can be employed in connection with performing automatic and/or inferred action in connection with the subject embodiments.

Various embodiments will be presented in terms of systems that may include a number of components, modules, and the like. It is to be understood and appreciated that the various systems may include additional components, modules, etc. and/or may not include all of the components, modules etc. discussed in connection with the figures. A combination of these approaches may also be used. The various embodiments disclosed herein can be performed on electrical devices including devices that utilize touch screen display technologies and/or mouse-and-keyboard type interfaces. Examples of such devices include computers (desktop and mobile), smart phones, personal digital assistants (PDAs), and other electronic devices both wired and wireless.

Referring initially to FIG. 1, illustrated is a system 100 for re-ranking search results retrieved by a search engine based on query log statistics. System 100 includes a query log component 102, a matching component 104, and a ranking component 106. The query log component 102 receives, obtains, etc. a listing of search results based on a query from a user and/or entity. For example, a user and/or entity (e.g., the Internet, another system, a computer, . . . ) can input or enter a word, term, or stream of words or terms into an interface component 108. A search engine 110 can retrieve a number of results based on the input query and can output such results to a search engine query log 112. The interface component 108, search engine 110, and/or search engine query log 112 can be components separate from system 100 that input information into system 100, as illustrated, or they can be components included in system 100. When a query is received by search engine 110, through interface 108, for example, a larger set of search results for the query than the set that should be presented to the user is computed according to an internal relevance algorithm(s) of the engine 110.

Query log component 102 can be configured to compare properties of each initial search result returned by search engine 110 (or search engine query log 112) in response to the user's query to a set of properties derived from query log component 102 for that query. The query log derived properties of the target query may be derived from absolute frequencies of the queries in the query log and/or relative frequencies of queries submitted by users that submitted the target query or related previous queries.

Query log component 102 can further be configured to build a language model 114 for a target query. Such language model can be built utilizing information stored in or retrievable by query log component 102, such as information stored in search engine query log 112, regarding the target query and queries related to it either lexically or temporally.

Matching component 104 can compare the lexical properties of the search results for the target query and the query language module 114 and can determine a match score 116. For example, for a query such as "dog", system 100 can retrieve the most frequent queries that contain the term dog (e.g., dog breeds, dog name, dog pile, dog breeders, dog pictures, dog training, dog health, dog beds, dog food, dog kennels, dog photos, dog adoption, dogs for sale) and associated counts or occurrence rate. Also retrieved can be the queries that precede and/or follow "dog" most frequently (e.g., cat, pet, pitbull, jack russell terrier, puppy, animals, border collie, chihuahua, game) and their frequencies.

The language model 114 for the target query can be compared with a language model for every search result and a match score can be computed from the search results or a subset of the search results. Ranking component 106 can be configured to rank or re-rank the search results based on the original ranking provided by search engine 110 or based on the match score. The re-ranked search results can be output, presented, displayed, communicated, etc. to a user, for example.

FIG. 2 illustrates exemplary user behaviors in a search space. Two rationales that can be considered when utilizing the one or more disclosed embodiments are query extensions and adjacent queries. Query extensions are the terms that expand a shorter query into a larger query. Adjacent queries are queries that precede or follow a query in a user search session. Both of these rationales can provide information regarding user's search intent(s). If a user is not satisfied with a current set of search results, the user may refine or rewrite the query for the purpose of generalization, specialization, or adding new information.

Two scenarios are illustrated at 202 (Scenario A) and 204 (Scenario B). An initial query "g" is followed by a sequence of actions that eventually lead to a relevant document "z". The circles of Scenario A 202 represent different tiers in a ranked list. A user in this scenario keeps browsing the result pages until finding a relevant document "z". In Scenario B 204, a user continuously reformulates the query until reaching a relevant document "z". The reformulations of Scenario B 204 can be utilized by the one or more embodiments disclosed herein to compute a match between documents that contain the query words and the typical intent(s) of users who have previously submitted the query or a similar query.

For example; a user submits the query "hard disk case" although a better or more accurate description (e.g., generally accepted and more frequently used on the web) is "hard drive enclosure". The results for such a query would suffer because a search engine would rank the documents based on their fit with the query terms, including term frequency and proximity even though some of the retrieved pages may contain the more accurate terms (such as "drive" and "enclosure"). A system that utilizes mutual information based on query log statistics can identify "hard disk" as a relevant prefix for the query and then generate the popular extensions "drive", "data recovery", "repair", "utilities", "failure", "problems", "eraser", "enclosure", etc. From user search sessions, the system can also retrieve co-occurring queries, such as "portable hard disk", "usb external hard drive", and "usb enclosures." The words in these extensions and queries can be used to re-rank the search results retrieved for the initial query, under the assumption that such additional information can help to better represent the typical user's real search intent, in concordance with previous findings.

Figure 3:
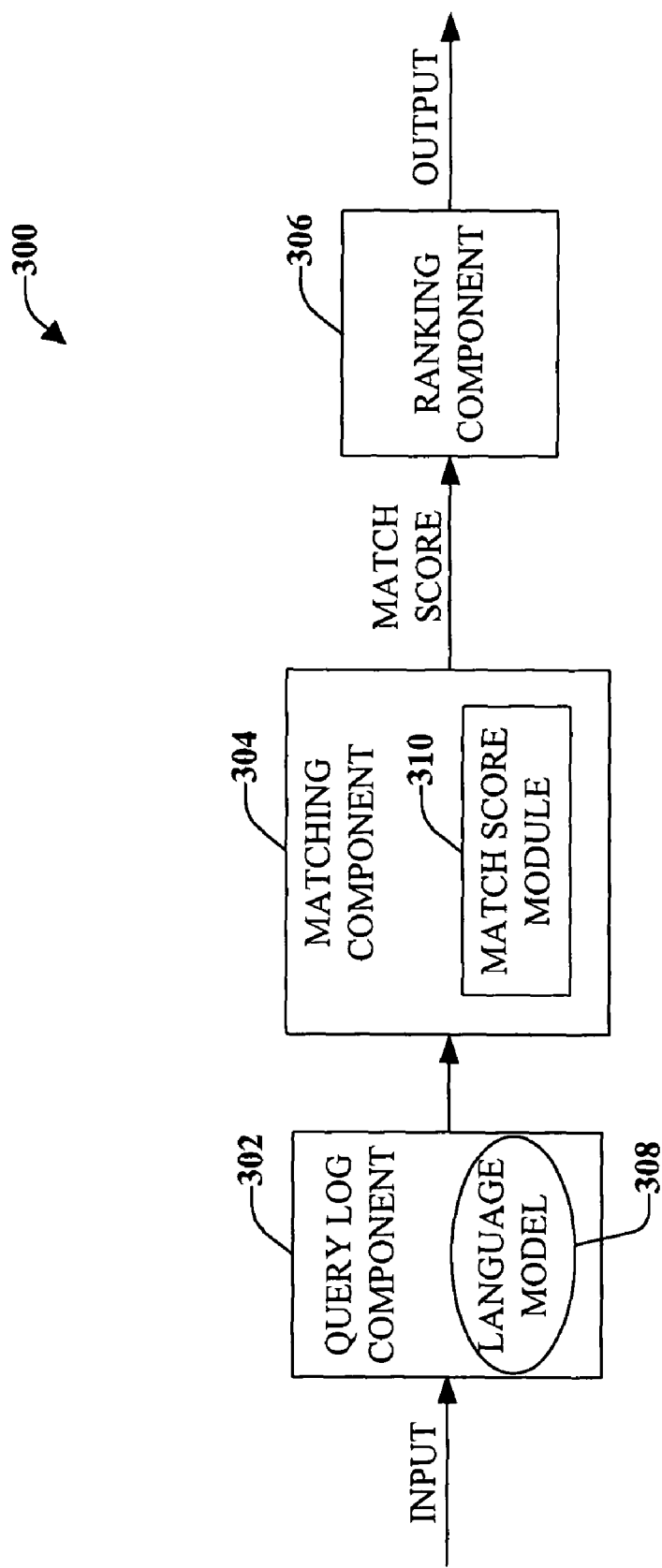
FIG. 3 illustrates a system for building a language model and re-ranking search results for a target query.

FIG. 3 illustrates a system 300 for building a language model and re-ranking search results for a target query. An initial search result and associated rankings, if any, is input or received by a query log component 302 that can be configured to compare properties of the search result received with properties of other queries that are either lexically or temporally related. The properties or terms from the related queries and their frequencies can be utilized by a query log component 302 to create or construct a language model 308. Query log component 302 can utilize a temporal similarity measure and/or a lexical similarity measure of the target query and the queries stored in a query log. In some embodiments, query log component 302 can derive the language model by utilizing the frequencies of queries in the query log.

Language model 308 can be, for example, a vector of terms, an associated probability distribution, and/or a probability distribution over query terms extracted from queries in the query log. In accordance with some embodiments, the query terms can be extracted from a set of queries that contain the target query as a substring, a set of queries that have a large lexical overlap with the target query, a set of queries with instances that precede the target query during a user search session, and/or a set of queries with instances that follow the target query in a user search session.

Matching component 304 can be configured to compare a current query with language model(s) 308 for every search result, which can be obtained by tokenizing a snippet and creating a word vector, for example. A snippet is a segment of a document or web page. Examples of a snippet include contiguous text regarding a single topic, a graph, a picture, a diagram, etc. A match score module 310 included in matching component 304 can be configured to compute a match score or comparison between a current query and other search results. Various similarity measures can be utilized to calculate the match score. Web pages that mention many of the frequent words utilized in queries when a term is searched (such as "dog") may cover many of the related topics that a user may be interested in (e.g., adoption, sale, breeds, puppy, . . . ). For example, a cosine similarity and KL-divergence, can be utilized to compare the models 308 and compute the match score. However, it should be understood that various algorithms, methods, and/or techniques can be employed to ascertain the match score. The match score information can be communicated to a ranking component 306 that can be configured to re-rank the search results received by query log component 302 and output these results to a user and/or entity.

For example purposes and not limitation, an algorithm for extracting query context will be described. However, it should be understood that other algorithms, methods, and/or techniques can be utilized to extract query context. In the following algorithm, Q denotes the set of queries in a search engine query log for a given time frame t. The notation $Q_{next}(q)$ represents the set of queries that follow a query q in a user session and $Q_{prev(q)}$ represents queries that precede the query q in a user session. The query context of query q consists of two types of queries: query extensions $Q_{ext}(q)$ and adjacent queries $Q_{adj}(q)$, defined as follows:

$$Q_{ext}(q) \doteq \{q_{ext} | qq_{ext} \epsilon Q\}$$

$$Q_{adj}(q) \doteq \{q_{adj} | q_{adj} \epsilon Q_{next}(q) \cup Q_{prev}(q)\}$$

In the above example, the argument q can be omitted whenever no ambiguity results by omitting the argument q. Preprocessing can be performed on $Q_{ext}$ and $Q_{adj}$ to remove stop-words and duplicates, as well as basic stemming.

Figure 4:
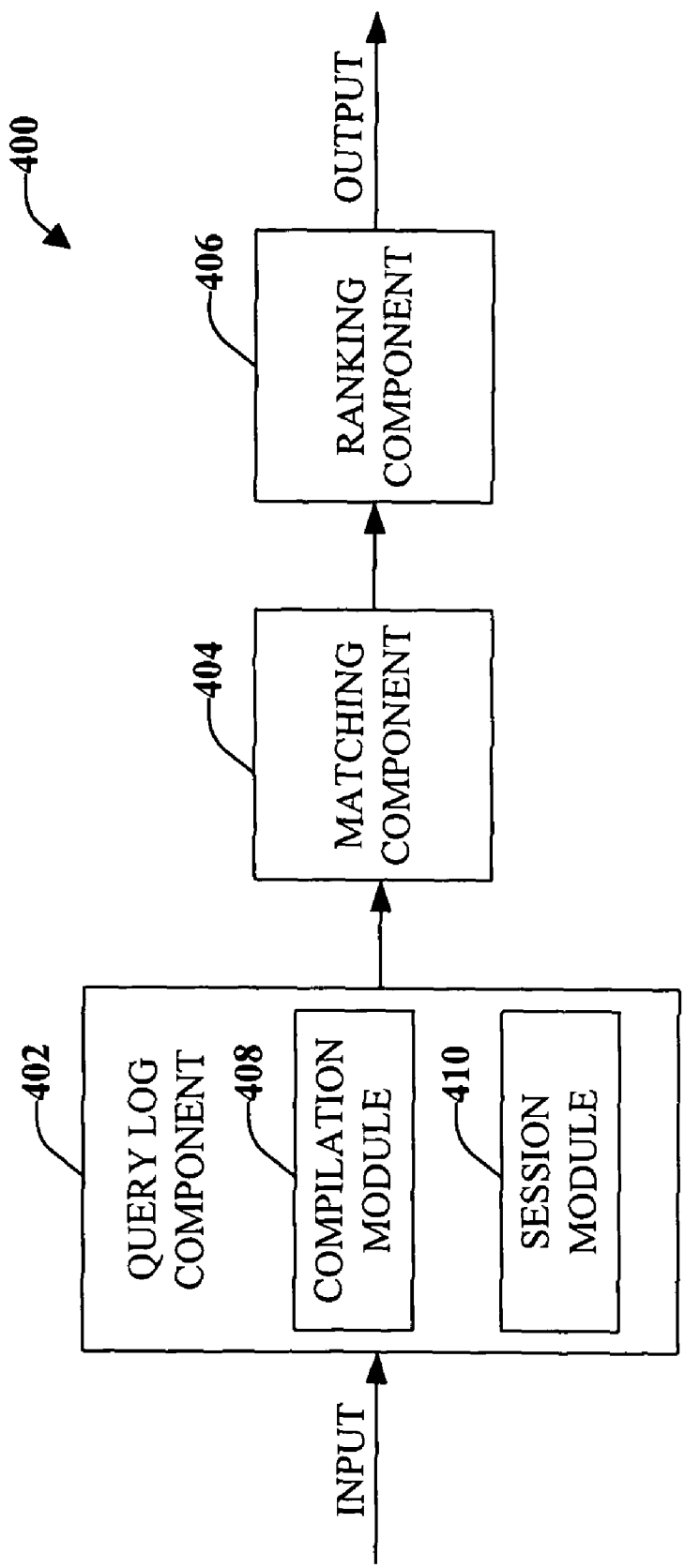
FIG. 4 illustrates a system for obtaining vector criteria for re-ranking search results.

FIG. 4 illustrates a system 400 for obtaining vector criteria for re-ranking search results. System 400 includes a query log component 402 that receives, obtains, seeks, etc. an input that contains a search result from a search engine and/or a search engine query log (not shown), similar to search engine 110 illustrated in FIG. 1. The search engine can retrieve a variety of results (e.g., Web pages, web sites) that might be of interest to a user and/or entity that requested a target search based on a word(s) or term(s) input or received by search engine. System 400 also includes a matching component 404 and a ranking component 406 that interface with query log component 402 to present or display a listing of search results in a ranking order that may be different from the ranking order returned by search engine.

Query log component 402 can include a compilation module 408 that can be configured to determine absolute frequencies and a session module 410 that can be configured to determine relative frequencies. Compilation module 408 can obtain, accept, etc. information regarding a search query input from all users of system 400 and determine an absolute frequency of search terms. Absolute frequencies are queries related lexically and include the total number of queries submitted by all users (from which system 400 can obtain information) that include the target query search term or that contain, as a subcomponent, a target query search term. Compilation module 408 does not capture information on a per-user session basis but rather gathers information across the entire system 400 of users. The information obtained should relate to a particular search term or query. Compilation module 408 can obtain the initial query as well as other words that appear in queries that contain the initial query. For example, a target query search term can be "Urban Development" and a query that contains a subset of the target query can be "Housing and Urban Development" and/or "Urban Development Publications" and the like. This information can be collected anonymously, maintaining user privacy. To mitigate concerns a user might have regarding others viewing such user's search history, access to such information can be restricted. In some embodiments, the user can have the opportunity to opt-in (or opt-out) of such a feature, thus mitigating privacy concerns.

Session module 410 can obtain, accept, etc. information regarding a search query input during a user session that are related temporally and determine a relative frequency of the queries. Relative frequencies are queries related temporally and include queries submitted during a user session and may or may not be related lexically. The information regarding a current, previous, and/or next query can be associated with each other and utilized to determine a ranking or re-ranking of a returned search result. A similar association of queries can be applied to an entire user session. This information can be collected anonymously, maintaining user privacy. Information from a number of user sessions can be collected and analyzed to determine a frequency of related queries. Sometimes a next or a previous query is related to the current query and sometimes it is not related. When the queries are related, there is a high frequency count when information across all user sessions is compiled and analyzed.

For example, a query can be for "Niagara Falls" and a next query can be for "National Wildlife Refuge" and a next query is for "Bosque del Apache" and the next query is for "New Mexico" and a next query can be for "Rock and Roll Hall of Fame". Since it is not clear whether these queries are related, system 400 can associate or relate a current, a previous, and a next query. Utilizing information received from a large spectrum of users can give a high frequency to those queries that are related. In this example, there may be a very low percentage of users that search first for "New Mexico" and then for "Rock and Roll Hall of Fame." However, the percentage of users that search for "National Wildlife Refuge" and then for "New Mexico" might have a much higher percentage. Thus, system 400 can infer, based on relative frequencies that a user who queries for "New Mexico" would prefer search results relating to "National Wildlife Refuge" rather than "Rock and Roll Hall of Fame". Thus, session module 410 can re-rank a search result based on the frequency information relating to "New Mexico", as described in the above example. If not related, the frequency should be very low, and thus ignored or given a lower percentage ranking when system 400 re-ranks the search results according to each result's relevance to the target query as determined by system 400. However, if the frequency is high, indicating the queries are related, system 400 will utilize such queries and give such search results a higher percentage when re-ranking an initial query.

Figure 5:
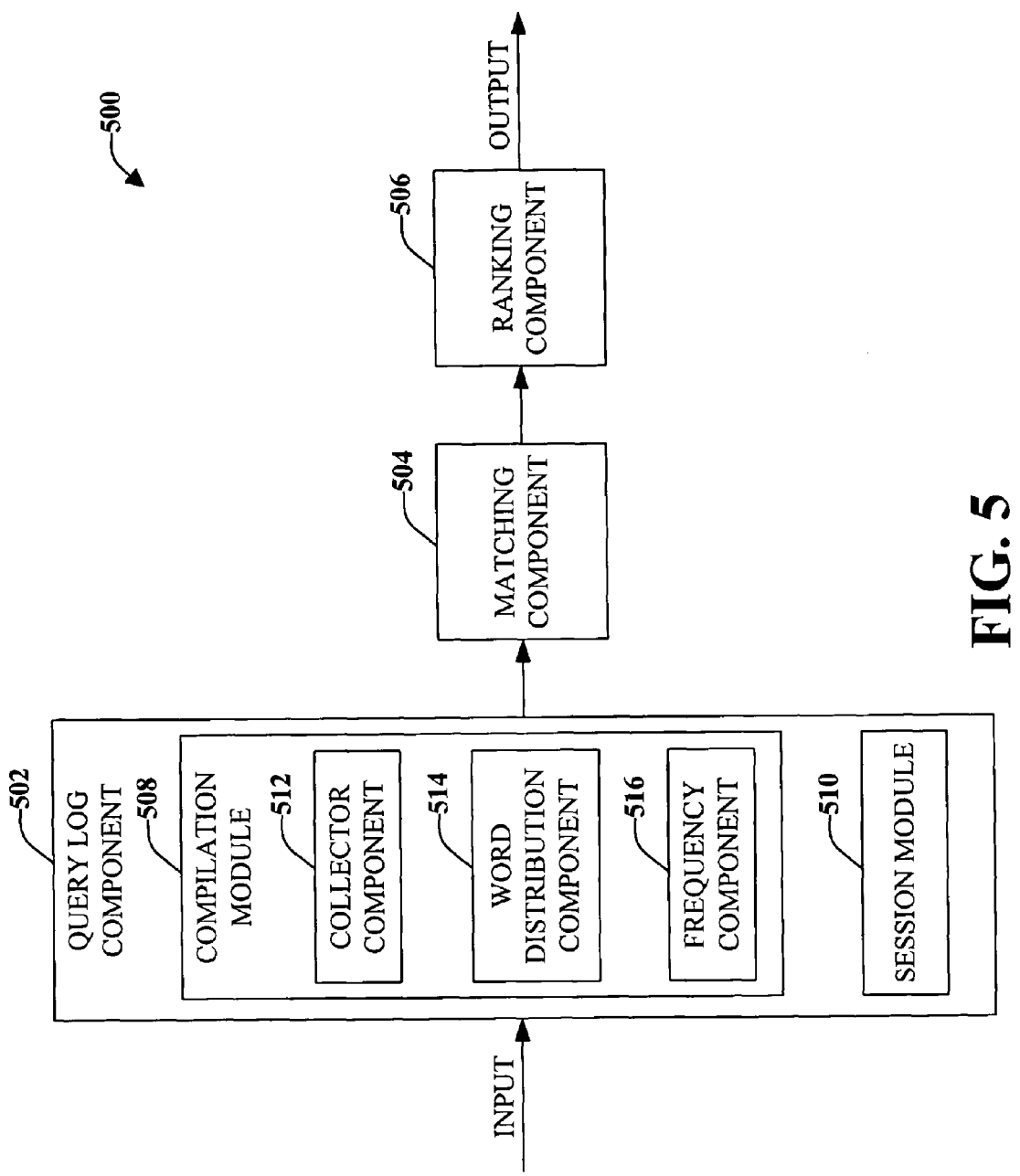
FIG. 5 illustrates a system for determining absolute frequencies of search terms for re-ranking a target query.

FIG. 5 illustrates a system 500 for determining absolute frequencies of search terms for re-ranking a target query. An input that includes a listing of search results ranked by a search engine, based upon a user and/or entity request, can be received by a query log component 502 that can be configured to analyze one or more properties of the search results and generate a language model. The properties may be obtained by processing a URL, page title(s), page content (body, text), snippets of the results of a document query pair, etc. Generally, a web page/document has one URL, one title, and one body, however, some may contain more than one. Snippets can be search-engine dependent or query dependent. For example, lexical properties of web search result snippets can be utilized to analyze the search results, however, the disclosed techniques can be applied to other settings.

A matching component 504 that interfaces with query log component 502 and a ranking component 506 can be configured to compare the language model for every search result and compute a match score. Matching component can utilize the language module to assign a matching score to a search result based on how the search result matches a title of a document returned as a search result, a text of the document, a URL, and/or a snippet generated by the search engine.

Ranking component 506 can be configured to review the search results provided to the query log component 502 and re-rank those results based on the original ranking provided by the search engine and the match score provided by matching component 504. These re-ranked search results can be output to the user and/or entity that initiated the query.

By way of example and not limitation, a user and/or entity can initiate a query or search through various types of user interfaces. For example, a user interface can provide a graphical user interface (GUI), a command line interface, and the like. For example, a GUI can be rendered that provides a user with a region or means to load, import, read, etc. the search term(s), word(s), phrases(s), etc., and can include a region to present the results of such. These regions can comprise known text and/or graphic regions comprising dialogue boxes, static controls, drop-down-menus, list boxes, pop-up menus, as edit controls, combo boxes, radio buttons, check boxes, push buttons, and graphic boxes. In addition, utilities to facilitate the presentation such as vertical and/or horizontal scroll bars for navigation and toolbar buttons to determine whether a region will be viewable can be employed. For example, the user can interact with the interface by entering the information into an edit control.

The user can also interact with the regions to select and provide information through various devices such as a mouse, a roller ball, a keypad, a keyboard, a pen and/or voice activation, for example. Typically, a mechanism such as a push button or the enter key on the keyboard can be employed subsequent entering the information in order to initiate the search. However, it is to be appreciated that the invention is not so limited. For example, merely highlighting a check box can initiate information conveyance. In another example, a command line interface can be employed. For example, the command line interface can prompt (e.g., through a text message on a display and an audio tone) the user for information by providing a text message. The user can then provide suitable information, such as alphanumeric input corresponding to an option provided in the interface prompt or an answer to a question posed in the prompt. It is to be appreciated that the command line interface can be employed in connection with a GUI and/or API. In addition, the command line interface can be employed in connection with hardware (e.g., video cards) and/or displays (e.g., black and white, and EGA) with limited graphic support, and/or low bandwidth communication channels.

Query log component 502 can be configured to obtain and analyze at least two sources or vectors of information. The first source of information is data obtained from all users by a compilation module 508. The information obtained and analyzed by compilation module 508 can be related lexically, wherein a query term or a query including a subset of the query term is utilized. A second source of information is data obtained by a session module 510 during at least one user session. The information analyzed by session module 510 can be related temporally during the same user session.

In order to obtain and analyze lexically related queries, compilation module can include a collector component 512, a word distribution component 514, and a frequency component 516. Collector component 512 can be configured to collect, request, obtain, receive, etc. a number of queries from a broad spectrum of users. The broad spectrum of users can include users that utilize a particular search engine(s) or it can be based on other criteria. The information obtained by collector component 512 does not have to be related temporally. Instead, collector component 512 can obtain and categorize the queries based on a word(s), term(s), phrase(s), and the like. A query that includes a particular word, term, and/or phrase as a subset or subcomponent of a query can be categorized, associated, and/or related to each other.

Word distribution component 514 can be configured to analyze the queries and analyze, record, etc. the other words that appear in queries that contain the initial query and obtain a raw count. A word distribution is performed to determine which word(s), if any, appears the largest number of times with the initial query. For example, a query for the term "car stereo" may be contained a high percentage of the time in the larger query for "car stereo accessories". The term "car stereo" might be contained in various percentage amounts in the larger queries "car stereo speaker" and/or "car stereo installation". The frequency component 516 determines the frequency of the words that appear in the query with the initial term(s). The queries with the highest frequencies are utilized to re-rank the original search results. It should be understood that there can be a long tail of queries that contain the initial term(s), however, the percentage of such words appearing together is small and, thus, system 500 might not consider or take into account these words, terms, phrases, etc. when re-ranking the search results.

Figure 6:
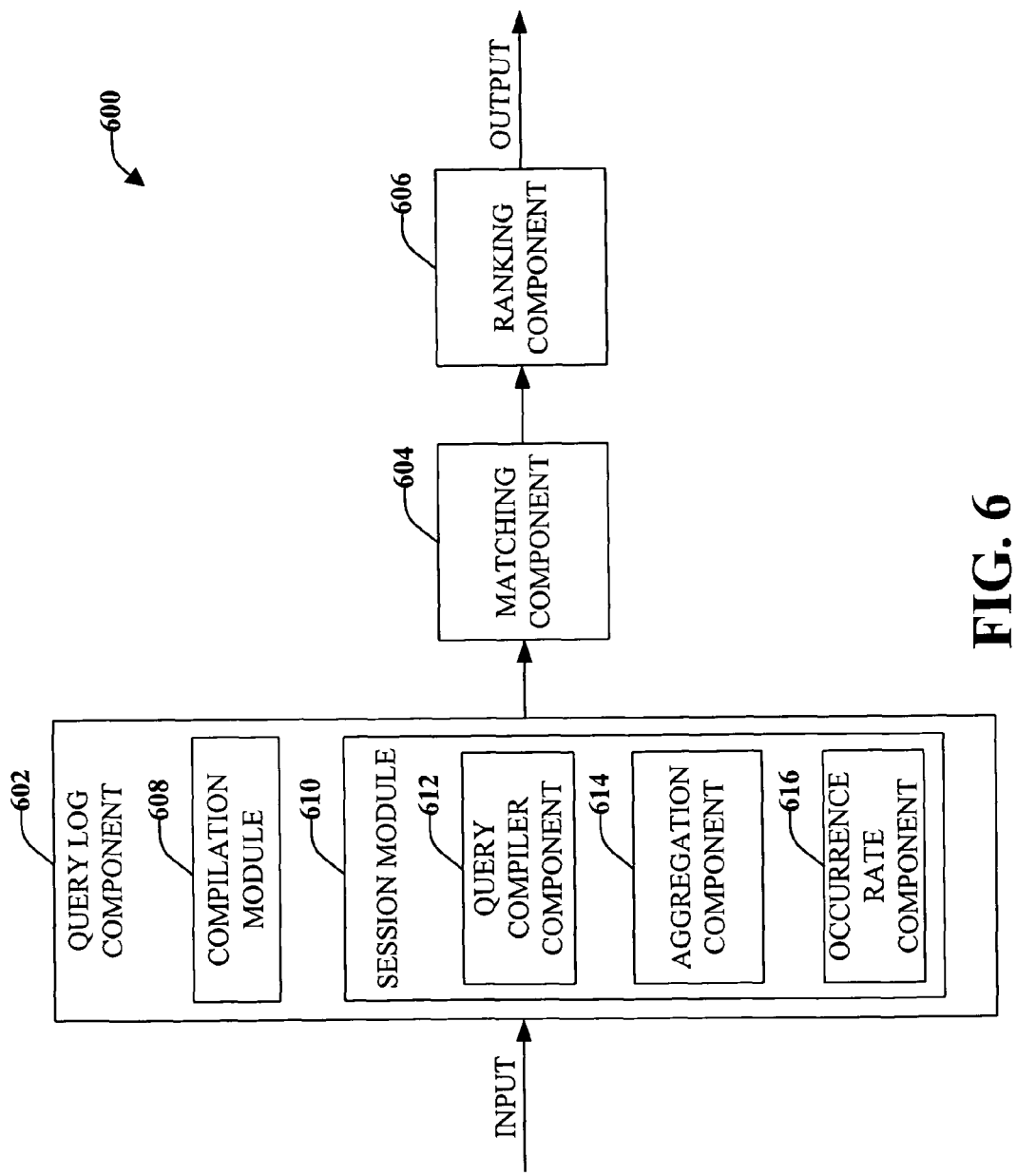
FIG. 6 illustrates a system for obtaining relative frequencies of searched terms for application with a target query ranking.

FIG. 6 illustrates a system 600 for obtaining relative frequencies of searched terms for application with a target query ranking. System 600 is similar to the systems shown and described with reference to the above figures. Included in system 600 is a query log component 602 that receives an input, which can be search results and related relevance ranking (if any). Query log component 602 includes a compilation module 608 that obtains and/or analyzes queries that are related lexically and a session module 610 that obtains and/or analyzes queries that are related temporally.

Session module 610 can include a query compiler component 612, an aggregation component 614, and an occurrence rate component 616. Query compiler component 612 can be configured to obtain information regarding queries input by a user during a user session. The queries input can be related temporally whereby queries that are input after (or before) each other are related. In some embodiments, all or a subset of all queries entered during a user session are associated or considered related temporally. For example, a user may initiate a session and enter queries that are ever expanding on one main theme or desired search. Therefore, all the queries during the session can be related. In accordance with some embodiments, the user can narrow down or drill into a main theme or search rather than expanding it. In such a manner, the user can obtain information more focused or tailored to the user's interests. Thus, a user can narrow (or broaden) a search and if the user then desires, the search can be broadened (or narrowed). The user can alternate between narrow and broad search results until the user obtains the desired information.

Aggregation component 614 can be configured to aggregate each individual user session and temporally related queries and compile that session result with all other user session results. Thus, each user session is analyzed individually and then aggregated with each of the other individually analyzed user sessions. An occurrence rate component 616 can be configured to ascertain the occurrence rate of temporally related queries across all user sessions.

For example, there may be a high occurrence rate during user sessions that a query such as "civil liberty" is temporally related (previous query, next query) to a query such as "promoting human rights". In such a situation, an aggregation of all user sessions can result in a an output to a matching component 604 that a user searching for "civil liberty" might also be interested in "promoting human rights". The ranking component 606 can take this information into account when the search results are re-ranked and output to the user and/or entity.

Figure 7:
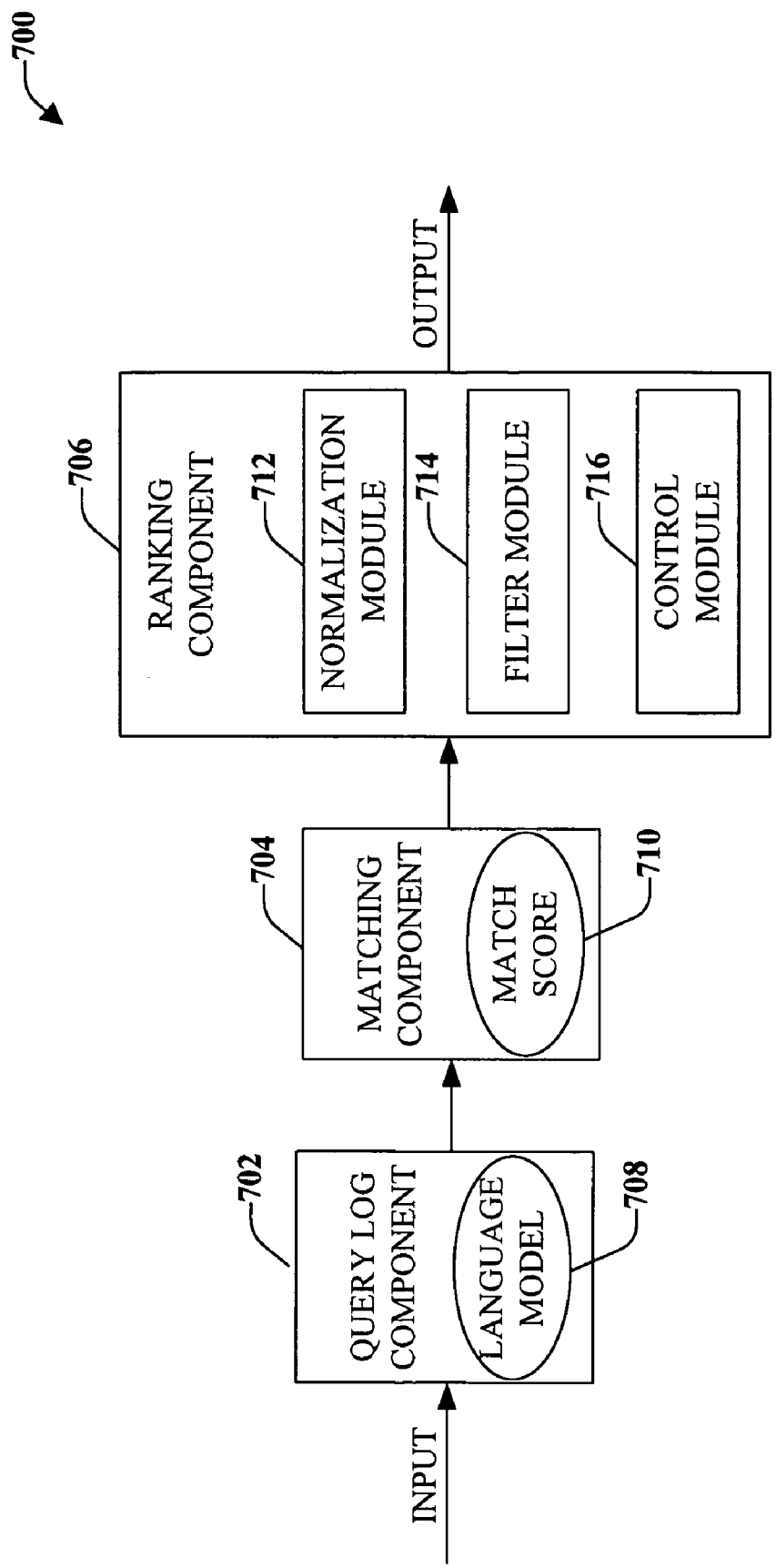
FIG. 7 illustrates a system for re-ranking query results.

FIG. 7 illustrates a system 700 for re-ranking query results. System 700 is similar to the systems shown and described in the above figures. An input is received at a query log component 702. Such input can be an initial search result and ranking as determined by a search engine. The query log component 702 can derive properties of the search result. Such properties of the search results can be obtained, for example, by processing the URL, page titles, page content, snippets of the results, etc. The derived properties of a target query may be derived from absolute frequencies of the queries in the query log and relative frequencies of queries submitted by users that submitted the target query or related queries previously received.

The properties or terms from the target query and/or related queries can be utilized by matching component 704 to create a language model 708. This language module 708 can be compared to a language model for every search result and a match score 710 can be calculated. This match score 710 can indicate the probability that two or more search results are related. The match score 710 can be communicated to or obtained by a ranking component 706 that can be configured to re-rank the initial search results input to query log component 702.

Ranking component 706 can include a normalization module 712, a filter module 714, and/or a control module 716, which can be optional modules. It should be understood that system 700 can include none of these modules or one or more module. Normalization module 712 and/or filter module 714 can be configured to discard frequent queries with low numbers of mutual information with the target query. An example is a term such as "aol". Normalization module 712 and/or filter module 714 can be utilized in such a manner to obtain a cleaner list of related queries than might otherwise be provided.

An optional control module or component 716 can be utilized to provide a user and/or entity a technique for personalizing, controlling, and/or apply a selective modification to at least one of the system component in order to change the ranking of the search results. The selectable modification can be to increase and/or decrease a diversity of top re-ranked search results. According to some embodiments, a slider can be utilized to provide input to a search engine. Such input can be for the search engine to obtain results that are relevant for most users in terms of the search query term(s) or that the user wants only the final search results. Depending on the position of the slider, the re-ranking can take into account more or less of the similarity of a document to a vector, such as a word being analyzed. It should be understood that other techniques and/or devices can be utilized for increasing and/or decreasing the diversity of a re-ranked search result.

For example purposes and not limitation, an algorithm for re-ranking search results will be described. However, it should be understood that other algorithms, methods, or techniques can be utilized to re-rank the search results. In the following algorithm, q denotes the initial query issued by a user and/or entity and D denotes a set of candidate documents for ranking. Generally, D contains the top-ranked n documents by a search engine for the initial query. A ranking score is assigned for each document d in D based on its lexical overlap with a set of most popular query extensions and adjacent queries to q, which will be described in the formula below. The numerator of this formula has two parts, corresponding to query extensions and adjacent queries, respectively. The term frequency-inverse document frequency (tf-idf) scores can be assigned to each query-document pair. The scores are then weighted by the natural logarithm of the normalized query log frequency in order to account for the difference popularity of queries. The two parts are weighted by the dampen factor, and then summed and divided by the initial rank of the document. This latter step can be performed to bias the re-ranking towards the initial ranking calculated by the search engine.

In the following equation $Q_{ext}$ and $Q_{adj}$ denote the sets of extensions and adjacent queries to q, respectively. A dampen factor leveraging the contribution of each type of query context is represented by $\gamma \in [0 \ldots 1]$. The frequency of query $q_j$ appearing in document d is denoted as $tf(q_j, d)$. $d \in D_{q_m}$ if $tf(q_m, d) > 0$. The frequency of query $q_j$ appearing in Q is denoted as $qf(q_j)$. $R(d)$ denotes the initial rank of d.

$$RS(d, q) \approx \gamma \cdot \frac{\sum_{m=1}^{|Q_{ext}|}\left[tf(q_m, d) \cdot \ln\frac{|D|}{|D_{q_m}|} \cdot \ln\frac{qf(q_m)}{\sum_{n=1}^{|Q_{ext}|} qf(q_n)}\right]}{R(d)} +$$

$$(1-\gamma)\frac{\sum_{m=1}^{|Q_{adj}|}\left[tf(q_m, d) \cdot \ln\frac{|D|}{|D_{q_m}|} \cdot \ln\frac{qf(q_m)}{\sum_{n=1}^{|Q_{adj}|} qf(q_n)}\right]}{R(d)}$$

Inputs into to the algorithm include the initial query q, query log Q, options op, c, n, and u, and ranked document set $D = \{d_1, \ldots, d_{c'}\}$ retrieved for q, where $c' \leq c$. It should be noted that D can consist of search-engine-generated snippets and, according to some embodiments, can use the full-text of Web pages. An output includes a re-ranked document set $(d_{\pi(1)}, \ldots d_{\pi(c')})$, where $\pi$ is a permutation of $1, \ldots, c'$. Another output can be expressed as:

```
Construct Q_ext (q) and Q_adj (q) from Q, given q and op
foreach document d ∈ D
    S_d ← RS(d,q_i)
if u > 0
    for i ← 1 to u,d_i ∈ D
        S_di ← max({S_d})+1
endif
Sort (descending) the documents d in D using S_d
return (d_π(1),...,d_π(c'))
```

In the above, op specifies whether $Q_{ext}$ and $Q_{adj}$ are utilized to construct the query context, as well as $|Q_{ext}|$ and $|Q_{adj}|$; c specifies how many document candidates to consider and n specifies the output ranking range, therefore $n \leq |D| \leq c$. Whether to retain the top u ranked result(s) is specified by u; if u is larger than zero, only the top n-u results are re-ranked.

According to some embodiments, duplicate websites can be removed by the algorithm. Thus, if two or more websites with the same top level URL are found in D, only the one with the highest rank might be retained. All other duplicates can be removed.

Figure 8:
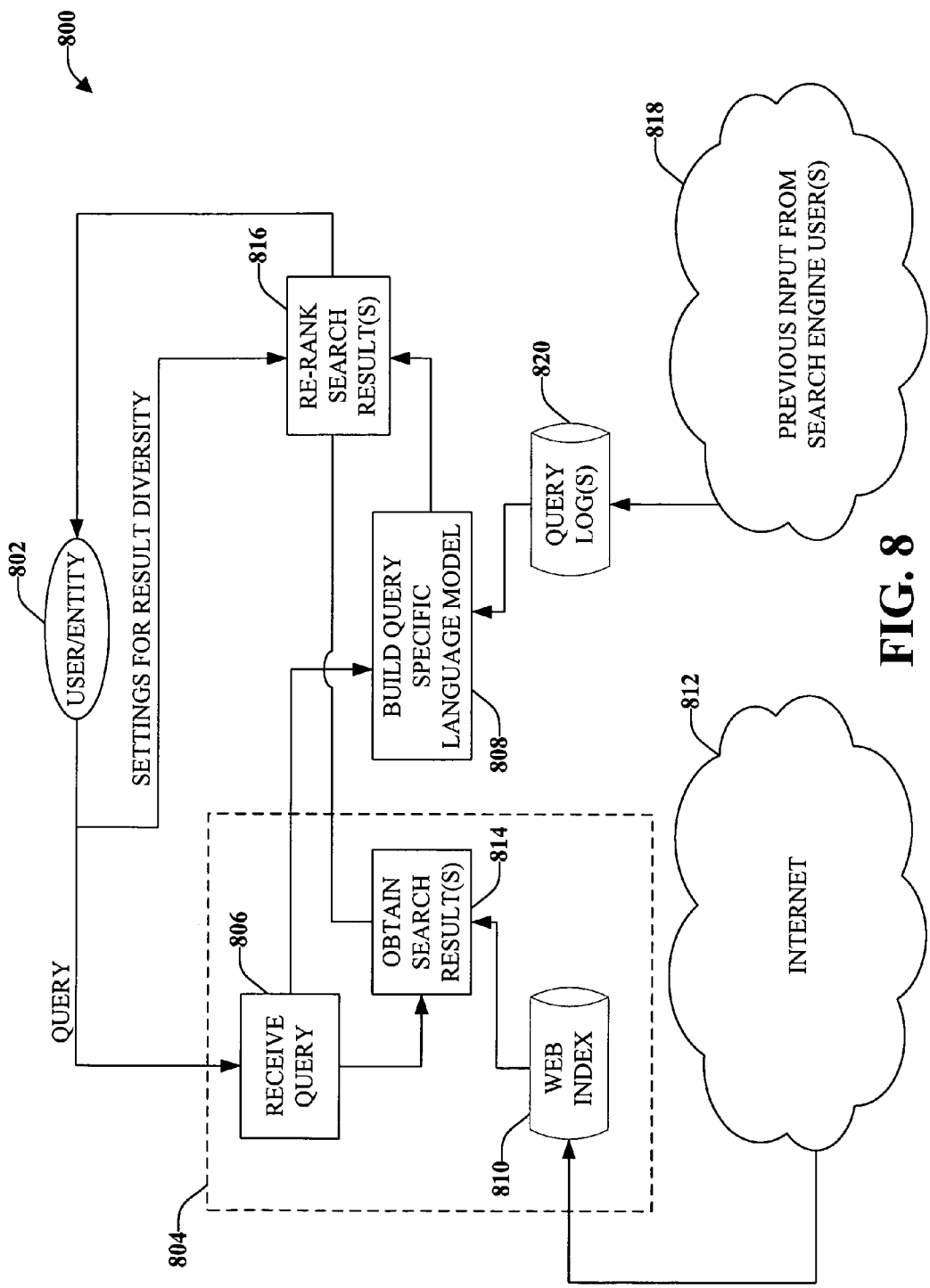
FIG. 8 illustrates a conceptual system for re-ranking search results.

FIG. 8 illustrates a conceptual system 800 for re-ranking search results. A user and/or entity 802 can input a query for intended search results. The query can be communicated to a search engine 804 that receives the query 806. The received query can also be communicated to a component that builds a query-specific language module 808. A web index 810 included in search engine 804 that can receive, request, etc. information or data from the Internet 812. Web index 810 can determine a larger set of search results for the query than the set that should be presented to the user 802 according to an internal relevance algorithm(s) of the search engine 804. The search result(s) 814 are obtained and communicated to a component configured to re-rank the search result(s) 816 and that utilizes the search result(s) and information from the component that builds a query specific language model 808. Information that was previously input by search engine user(s) 818 are communicated or obtained by a query log(s) 820. The query log(s) 820 can evaluate parameters of the search terms and their relevance to the query input by the user and/or entity 802.

The component that re-ranks the search results 816 can receive optional user settings for result diversity. These optional settings can provide the user and/or entity 802 an opportunity to modify or personalize the re-ranked search results. The re-rank search result(s) 816 can be presented to user and/or entity 802 through a plurality of display devices.

A technique for personalizing the re-ranked search results can be to analyze prior searches entered by the user who entered the target query. For example, the user can enter the search term "dog". Based on query log information, it may be determined that "dog" and "cat" are related because they occur many times in sessions, for example. Then, by reviewing the user's history it is determined that dog appears with the word "allergy". Therefore, an inference can be made that the user would like a result with the words "cat allergy" ranked higher than other results, such as "cat food". The information relating the user session and/or history can be retained on a user machine and/or remote from the user machine. Retaining the information on the user machine can mitigate privacy concerns that a user might have regarding the accessibility of such user's searches. If the information is retained remote from the user machine, appropriate safeguards should be in place to maintain the information in a confidential manner such that undesired distribution or access is mitigated.

In view of the exemplary systems shown and described above, methodologies, which may be implemented in accordance with one or more aspects of the various embodiments, will be better appreciated with reference to the diagram of FIGS. 9-12. While, for purposes of simplicity of explanation, the methodologies are shown and described as a series of acts (or function blocks), it is to be understood and appreciated that the methodologies are not limited by the order of acts, as some acts may, in accordance with these methodologies, occur in different orders and/or concurrently with other acts from that shown and described herein. Moreover, not all illustrated acts may be required to implement a methodology in accordance with one or more aspects of the disclosed embodiments. It is to be appreciated that the various acts may be implemented by software, hardware, a combination thereof or any other suitable means (e.g. device, system, process, component) for carrying out the functionality associated with the acts. It is also to be appreciated that the acts are merely to illustrate certain aspects presented herein in a simplified form and that these aspects may be illustrated by a lesser and/or greater number of acts. Moreover, not all illustrated acts may be required to implement the following methodologies. Those skilled in the art will understand and appreciate that a methodology could alternatively be represented as a series of interrelated states or events, such as in a state diagram.

Figure 9:
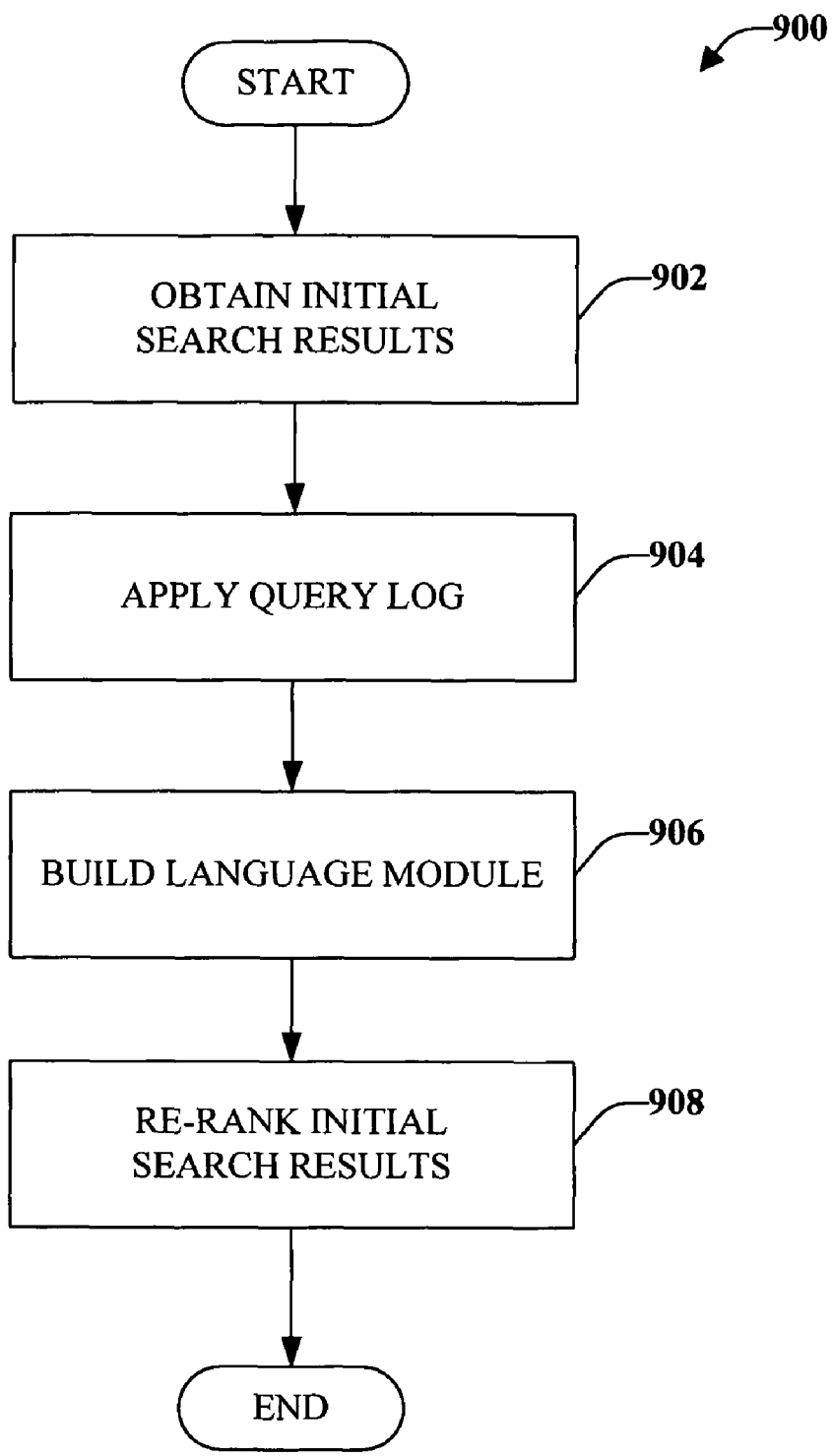
FIG. 9 illustrates a methodology for re-ranking initial search results.

FIG. 9 illustrates a methodology 900 for re-ranking initial search results. Methodology 900 can enable a search engine to present more relevant results according to needs with regard to the user. At 902, initial set of search results are obtained based on a query received that includes a term or series of terms. This query can be received from, for example, a user and/or entity (e.g., the Internet, another system, a computer, . . . ). The query can be unambiguous and describe the intended search result in specific detail or the query can be ambiguous and, to provide the intended search result, more information is needed.

Since the search results obtained at 902 might not be relevant to the results actually desired, depending on the ambiguity of the entered search term(s), a query log is employed to analyze and re-rank the results, at 904. This process can improve the relevance of the search results and can increase and/or decrease the diversity of the search results presented. The query log captures properties of previous queries from one or more user. These properties can be utilized to derive properties of the target query from absolute frequencies of the queries received by query log and/or from relative frequencies of queries submitted by the user and/or entity that submitted the target query or related queries previously (e.g., same session, different session). Such properties can be derived from logged statistics for queries that contain the target query as a prefix and queries submitted by user(s) immediately before and/or after submitting the target query. Thus, the results obtained, at 902, can contain a larger set of search results for the query than the set that will be presented.

A language module is built, at 906, for the target query and can be based on temporally related queries and/or lexically related queries. The language model can be built on, for example, information stored in or accessible by the query log that is relevant to the target query and queries related to the target query lexically and/or temporally. The language model can be a vector of terms and associated probability distribution, for example. A match score can be ascertained with the language model utilizing various similarity measures. At 908, the search results obtained at 902 are re-ranked based on the original ranking provided by a search engine, for example, and the match score.

According to some embodiments, diversity can be taken into account in the set of results returned. This may be useful for highly ambiguous queries such as a query for "cat" that can refer to difference senses of the word (e.g., "cat breeds", "cat in the hat", "cat stevens", "cat equipment", "cat furniture", "cat scan"). Thus, an interactive process can be employed to build the search result set to be shown to the user. For example, a highly diverse set of search results for the query "cat" can contain results about many of the different senses of the word. A less diverse set can contain results that cover topics consistent with the most frequent sense(s) of the word.

Such diversity can be accomplished by employing an iterative process or re-ranking scheme to build the search result set to be output or displayed to a user. In each iteration, one search result can be added to that set or re-ranked list in each iteration based on its similarity with the query language model associated with that iteration, which can then be modified by discounting the terms that matched the search result selected.

The diversity of the results can be controlled by utilizing various discounting schemes (e.g., aggressive, moderate, zero-discount). The discounting scheme can be applied to the query language model to decrease the similarity of the query language model to the selected search result. For example, a user's preference can be received as input for the diversity of topics covered by the search results and such preference can be utilized to choose at least one of a set of pre-defined discounting schemes. For example, a highly diverse set of search results for the query "cat" might contain results about a variety of different senses of cat. A less diverse set might contain results that cover topics consistent with the most frequent sense(s) of the word.

Figure 10:
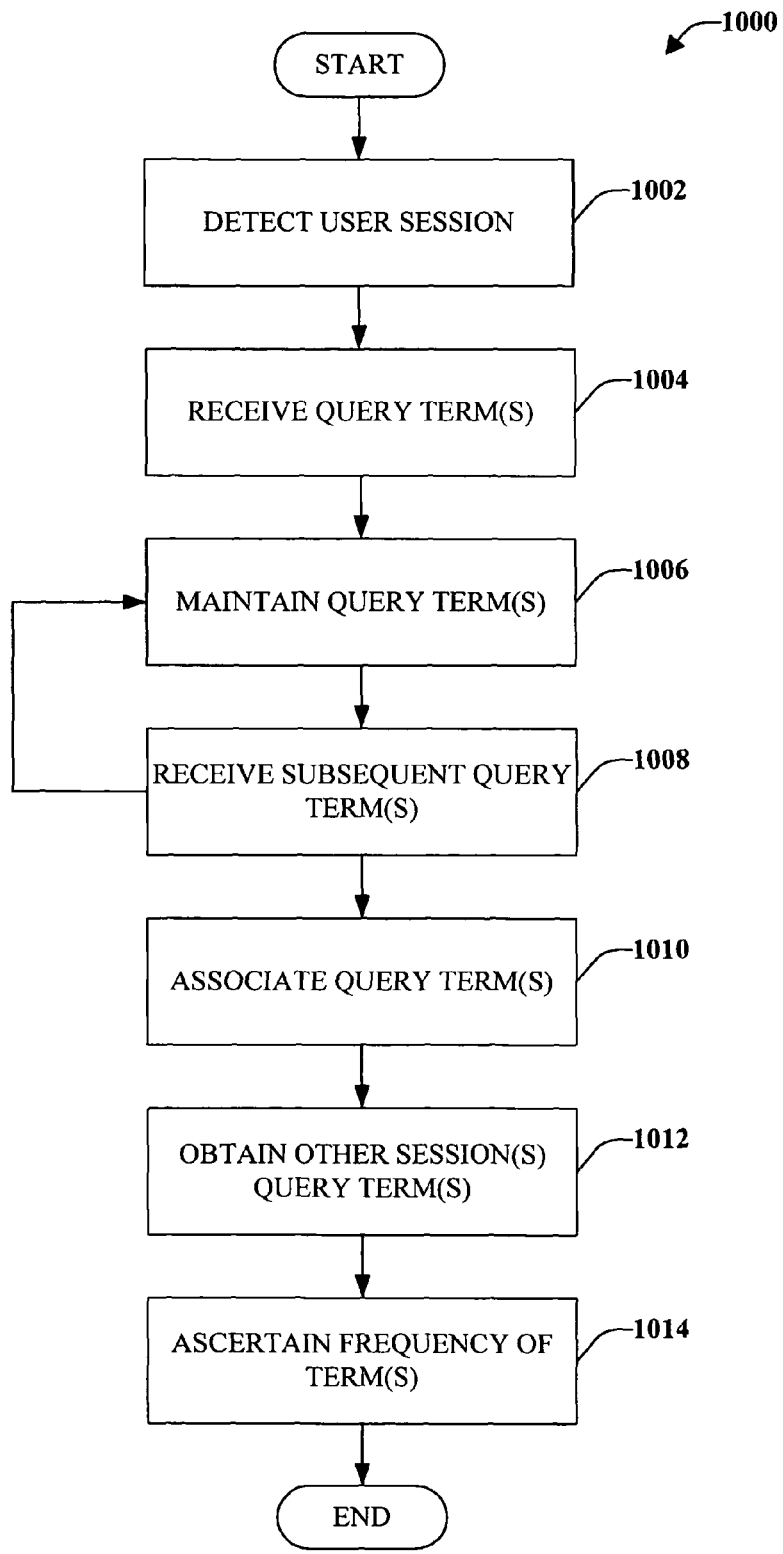
FIG. 10 illustrates a methodology for ascertaining a relative frequency of search term(s).

FIG. 10 illustrates a methodology 1000 for ascertaining a relative frequency of search term(s) based on temporally related queries. At 1002, a user session is detected. During the detected session, at least one query for a term or string of terms is received at 1004. This query can be specific or ambiguous. At 1006, the query term(s) are maintained by a query log, for example. Subsequent query term(s) are received, at 1008. The subsequent query term(s) can be related to the previous term(s) or completely unrelated. The subsequent query term(s) can be maintained, at 1006. It is to be understood that this act can be recursive such that any number of query term(s) can be received.

The query term(s) of a previous, current, and/or next query are associated, at 1010. One or more query term(s) from other sessions are obtained, at 1012. These one or more query term(s) can be received from previous users (either different or the same as the current user) that utilized a common search engine, for example. A frequency of related or associated search term(s) is ascertained, at 1014. The frequency of term(s) can be utilized to re-rank the search results and to present the re-ranked search terms to the user.

Figure 11:
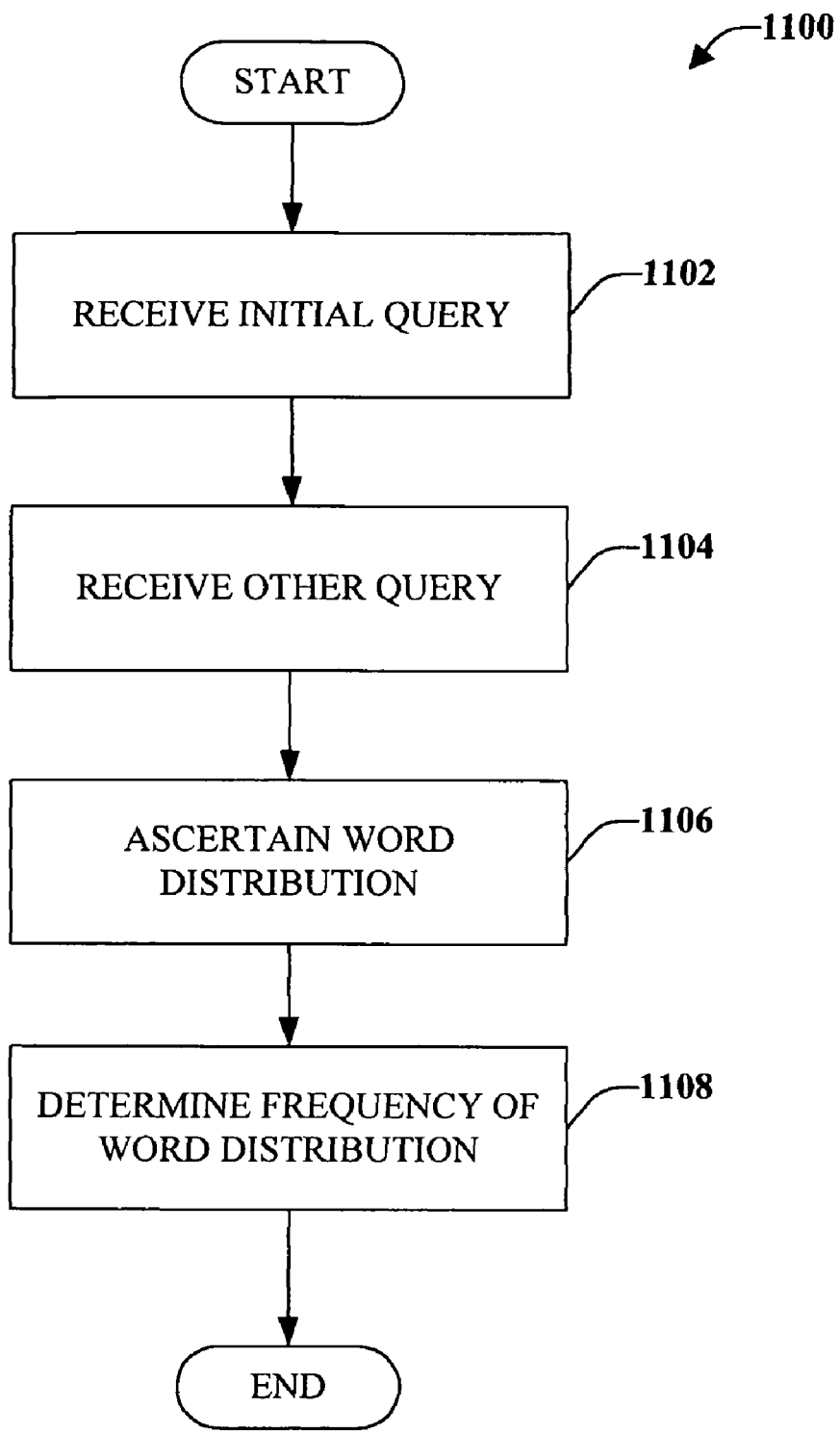
FIG. 11 illustrates a methodology for ascertaining absolute frequency of search term(s).

FIG. 11 illustrates a methodology 1100 for ascertaining absolute frequency of search term(s) based on lexically related queries. At 1102, an initial query is received. This initial query can be the result of a user and/or entity entering a search term or stream of terms. A search engine can conduct a search based on the search term(s) and retrieve, for example, the top one hundred results that the user might be interest in receiving. Another query that includes a subset of the initial query is obtained, at 1104. This second query can be a result of the same user or another user requesting a search result based on input term(s) or word(s). For example, queries from all users can be obtained (anonymously) and compiled with other queries that contain the same or similar search words or terms. For example, an initial query can be for the term "dog" and a next query can be for the words "dog kennel" and a subsequent query for the words "dog breeds." These queries do not have to be in close temporal proximity and do not have to be submitted by the same user. The queries can be related based on the word "dog" whereby the second and subsequent query contains a subset of the initial query "dog".

At 1106, a word distribution is ascertained to determine the commonality of an initial query with related queries. A frequency of the word distribution is determined, at 1108. The frequency is utilized to re-rank search results and to present such re-ranked search results to a user from which the initial query was received.

Figure 12:
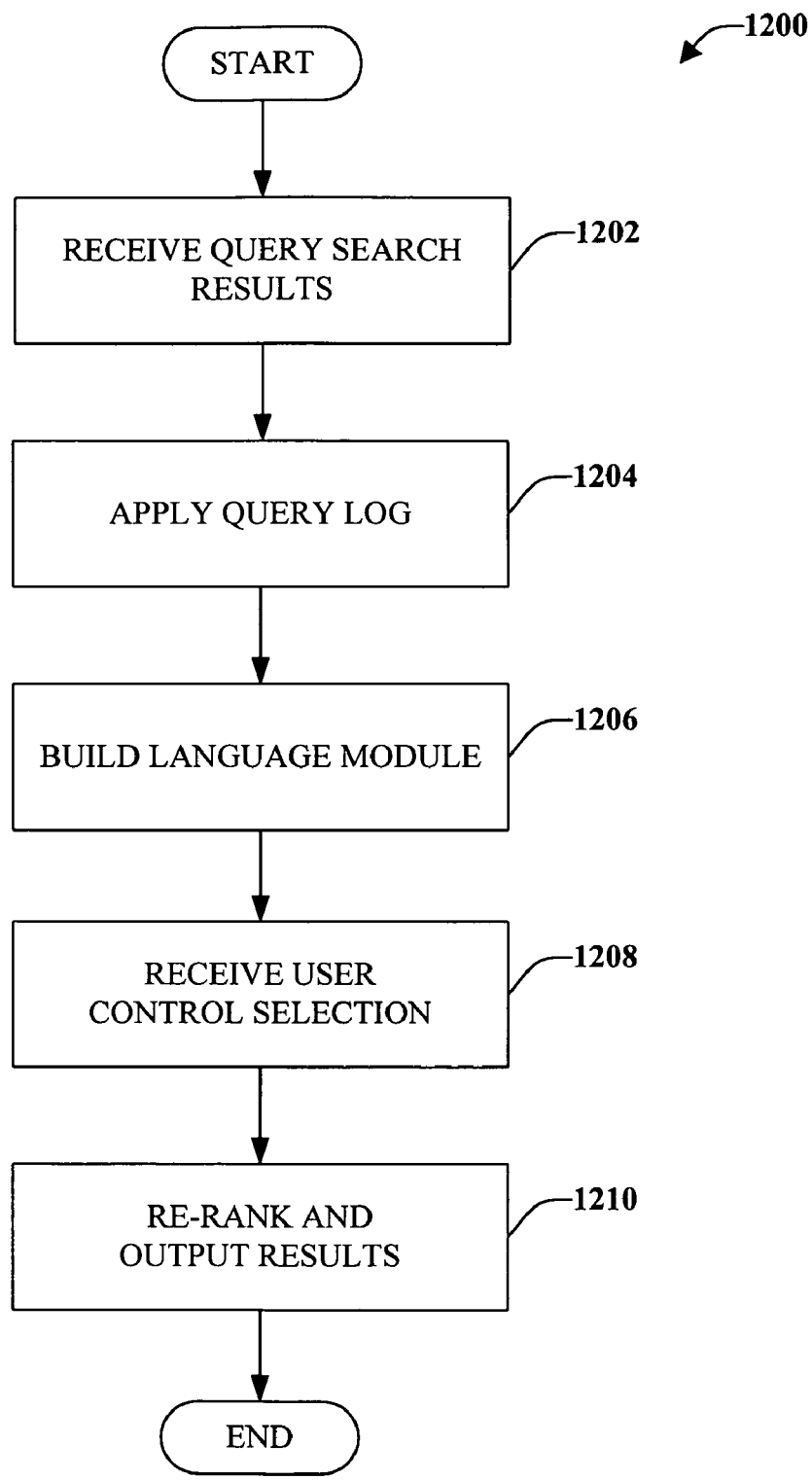
FIG. 12 illustrates a methodology for applying a user control(s) to re-rank search results

FIG. 12 illustrates a methodology 1200 for applying a user control(s) to re-rank search results. A user can input search term(s) to retrieve relevant documents, web sites, and the like. The input search terms can result in returned results that can be based on a query during a user session (temporally) or an aggregation of all user queries submitted without regard to the particular session (lexically). The search results are received, at 1202. A query log is applied to the received search results though a query log analysis, at 1204. The query log can be derived from absolute frequencies of the queries in the query log and/or relative frequencies of queries submitted by users that submitted the target query or related queries previously. For example, properties can be derived from logged statistics for queries that contain the target query as a prefix and queries submitted by users before and/or after they submitted the target query.

At a similar time, a language model is built, at 1206, for the target query by utilizing information stored or retrievable by the query log concerning the target query and queries related to it lexically and/or temporally. A user control selection is received, at 1208. The user control selection can allow the user to personalize or control the resulting re-ranking of the search results (e.g., similarity with other queries). The user control selection can also be utilized to increase or decrease the diversity of the re-ranked search result. The user control selection is applied and at 1210, a re-ranking is performed and the results are output to the user.

Figure 13:
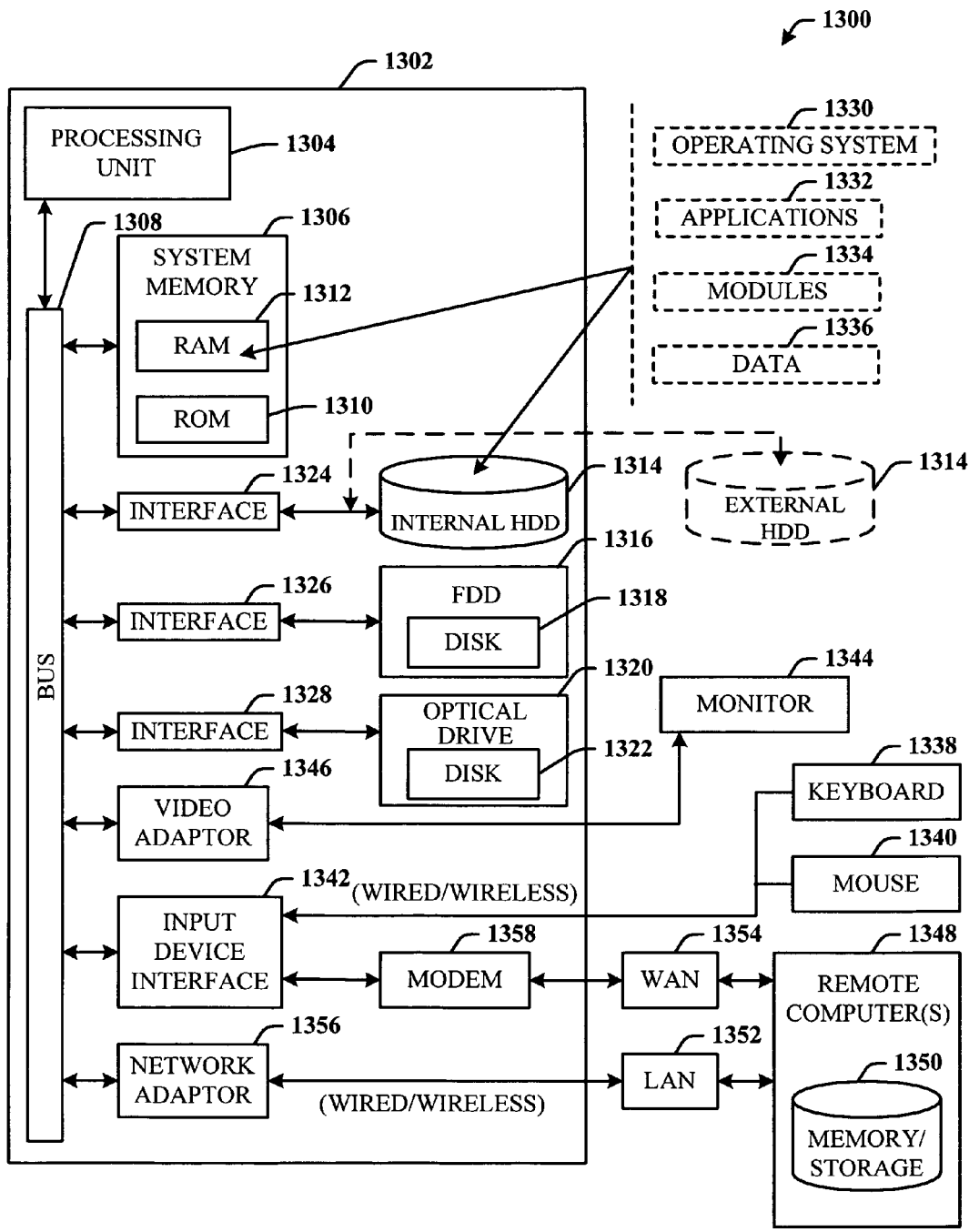
FIG. 13 illustrates a block diagram of a computer operable to execute the disclosed embodiments.

Referring now to FIG. 13, there is illustrated a block diagram of a computer operable to execute the disclosed architecture. In order to provide additional context for various aspects disclosed herein, FIG. 13 and the following discussion are intended to provide a brief, general description of a suitable computing environment 1300 in which the various aspects can be implemented. While the one or more embodiments have been described above in the general context of computer-executable instructions that may run on one or more computers, those skilled in the art will recognize that the various embodiments also can be implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated aspects may also be practiced in distributed computing environments where certain tasks are performed by remote processing devices that are linked through a communications network. In a distributed computing environment, program modules can be located in both local and remote memory storage devices.

A computer typically includes a variety of computer-readable media. Computer-readable media can be any available media that can be accessed by the computer and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital video disk (DVD) or other optical disk storage, magnetic cassettes, magnetic tape, magnetic disk storage or other magnetic storage devices, or any other medium which can be used to store the desired information and which can be accessed by the computer.

Communication media typically embodies computer-readable instructions, data structures, program modules or other data in a modulated data signal such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

With reference again to FIG. 13, the exemplary environment 1200 for implementing various aspects includes a computer 1302, the computer 1302 including a processing unit 1304, a system memory 1306 and a system bus 1308. The system bus 1308 couples system components including, but not limited to, the system memory 1306 to the processing unit 1304. The processing unit 1304 can be any of various commercially available processors. Dual microprocessors and other multi-processor architectures may also be employed as the processing unit 1304.

The system bus 1308 can be any of several types of bus structure that may further interconnect to a memory bus (with or without a memory controller), a peripheral bus, and a local bus using any of a variety of commercially available bus architectures. The system memory 1306 includes read-only memory (ROM) 1310 and random access memory (RAM) 1312. A basic input/output system (BIOS) is stored in a nonvolatile memory 1310 such as ROM, EPROM, EEPROM, which BIOS contains the basic routines that help to transfer information between elements within the computer 1302, such as during start-up. The RAM 1312 can also include a high-speed RAM such as static RAM for caching data.

The computer 1302 further includes an internal hard disk drive (HDD) 1314 (e.g., EIDE, SATA), which internal hard disk drive 1314 may also be configured for external use in a suitable chassis (not shown), a magnetic floppy disk drive (FDD) 1316, (e.g., to read from or write to a removable diskette 1318) and an optical disk drive 1320, (e.g., reading a CD-ROM disk 1322 or, to read from or write to other high capacity optical media such as the DVD). The hard disk drive 1314, magnetic disk drive 1316 and optical disk drive 1220 can be connected to the system bus 1308 by a hard disk drive interface 1324, a magnetic disk drive interface 1326 and an optical drive interface 1328, respectively. The interface 1324 for external drive implementations includes at least one or both of Universal Serial Bus (USB) and IEEE 1294 interface technologies. Other external drive connection technologies are within contemplation of the one or more embodiments.

The drives and their associated computer-readable media provide nonvolatile storage of data, data structures, computer-executable instructions, and so forth. For the computer 1302, the drives and media accommodate the storage of any data in a suitable digital format. Although the description of computer-readable media above refers to a HDD, a removable magnetic diskette, and a removable optical media such as a CD or DVD, it should be appreciated by those skilled in the art that other types of media which are readable by a computer, such as zip drives, magnetic cassettes, flash memory cards, cartridges, and the like, may also be used in the exemplary operating environment, and further, that any such media may contain computer-executable instructions for performing the methods disclosed herein.

A number of program modules can be stored in the drives and RAM 1312, including an operating system 1330, one or more application programs 1332, other program modules 1334 and program data 1336. All or portions of the operating system, applications, modules, and/or data can also be cached in the RAM 1312. It is appreciated that the various embodiments can be implemented with various commercially available operating systems or combinations of operating systems.

A user can enter commands and information into the computer 1302 through one or more wired/wireless input devices, e.g., a keyboard 1338 and a pointing device, such as a mouse 1340. Other input devices (not shown) may include a microphone, an IR remote control, a joystick, a game pad, a stylus pen, touch screen, or the like. These and other input devices are often connected to the processing unit 1304 through an input device interface 1342 that is coupled to the system bus 1308, but can be connected by other interfaces, such as a parallel port, an IEEE 1394 serial port, a game port, a USB port, an IR interface, etc.

A monitor 1344 or other type of display device is also connected to the system bus 1308 through an interface, such as a video adapter 1346. In addition to the monitor 1344, a computer typically includes other peripheral output devices (not shown), such as speakers, printers, etc.

The computer 1302 may operate in a networked environment using logical connections through wired and/or wireless communications to one or more remote computers, such as a remote computer(s) 1348. The remote computer(s) 1348 can be a workstation, a server computer, a router, a personal computer, portable computer, microprocessor-based entertainment appliance, a peer device or other common network node, and typically includes many or all of the elements described relative to the computer 1302, although, for purposes of brevity, only a memory/storage device 1350 is illustrated. The logical connections depicted include wired/wireless connectivity to a local area network (LAN) 1352 and/or larger networks, e.g., a wide area network (WAN) 1354. Such LAN and WAN networking environments are commonplace in offices and companies, and facilitate enterprise-wide computer networks, such as intranets, all of which may connect to a global communications network, e.g., the Internet.

When used in a LAN networking environment, the computer 1202 is connected to the local network 1352 through a wired and/or wireless communication network interface or adapter 1356. The adaptor 1356 may facilitate wired or wireless communication to the LAN 1352, which may also include a wireless access point disposed thereon for communicating with the wireless adaptor 1356.

When used in a WAN networking environment, the computer 1302 can include a modem 1358, or is connected to a communications server on the WAN 1354, or has other means for establishing communications over the WAN 1354, such as by way of the Internet. The modem 1358, which can be internal or external and a wired or wireless device, is connected to the system bus 1308 through the serial port interface 1342. In a networked environment, program modules depicted relative to the computer 1302, or portions thereof, can be stored in the remote memory/storage device 1350. It will be appreciated that the network connections shown are exemplary and other means of establishing a communications link between the computers can be used.

The computer 1302 is operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This includes at least Wi-Fi and Bluetooth™ wireless technologies. Thus, the communication can be a predefined structure as with a conventional network or simply an ad hoc communication between at least two devices.

Wi-Fi, or Wireless Fidelity, allows connection to the Internet from a couch at home, a bed in a hotel room, or a conference room at work, without wires. Wi-Fi is a wireless technology similar to that used in a cell phone that enables such devices, e.g., computers, to send and receive data indoors and out; anywhere within the range of a base station. Wi-Fi networks use radio technologies called IEEE 802.11 (a, b, g, etc.) to provide secure, reliable, fast wireless connectivity. A Wi-Fi network can be used to connect computers to each other, to the Internet, and to wired networks (which use IEEE 802.3 or Ethernet). Wi-Fi networks operate in the unlicensed 2.4 and 5 GHz radio bands, at an 11 Mbps (802.11a) or 54 Mbps (802.11b) data rate, for example, or with products that contain both bands (dual band), so the networks can provide real-world performance similar to the basic 10BaseT wired Ethernet networks used in many offices.

Figure 14:
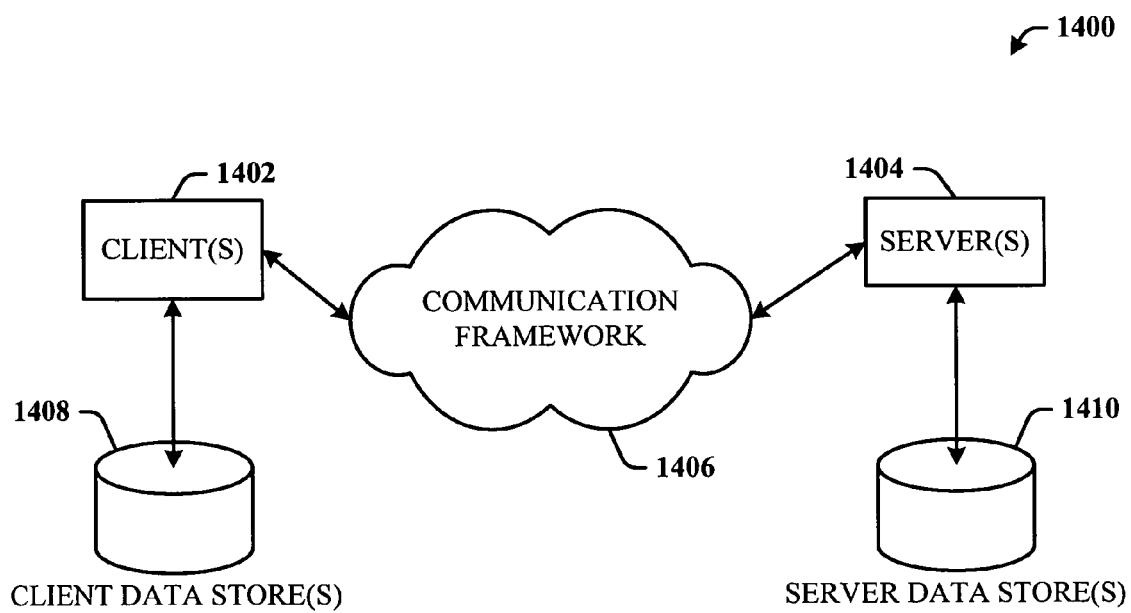
FIG. 14 illustrates a schematic block diagram of an exemplary computing environment operable to execute the disclosed embodiments.

Referring now to FIG. 14, there is illustrated a schematic block diagram of an exemplary computing environment 1400 in accordance with the various embodiments. The system 1400 includes one or more client(s) 1402. The client(s) 1402 can be hardware and/or software (e.g., threads, processes, computing devices). The client(s) 1402 can house cookie(s) and/or associated contextual information by employing the various embodiments, for example.

The system 1400 also includes one or more server(s) 1404. The server(s) 1404 can also be hardware and/or software (e.g., threads, processes, computing devices). The servers 1404 can house threads to perform transformations by employing the various embodiments, for example. One possible communication between a client 1402 and a server 1404 can be in the form of a data packet adapted to be transmitted between two or more computer processes. The data packet may include a cookie and/or associated contextual information, for example. The system 1400 includes a communication framework 1406 (e.g., a global communication network such as the Internet) that can be employed to facilitate communications between the client(s) 1402 and the server(s) 1404.

Communications can be facilitated through a wired (including optical fiber) and/or wireless technology. The client(s) 1402 are operatively connected to one or more client data store(s) 1408 that can be employed to store information local to the client(s) 1402 (e.g., cookie(s) and/or associated contextual information). Similarly, the server(s) 1404 are operatively connected to one or more server data store(s) 1410 that can be employed to store information local to the servers 1404.

What has been described above includes examples of the various embodiments. It is, of course, not possible to describe every conceivable combination of components or methodologies for purposes of describing the various embodiments, but one of ordinary skill in the art may recognize that many further combinations and permutations are possible. Accordingly, the subject specification intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects. In this regard, it will also be recognized that the various aspects include a system as well as a computer-readable medium having computer-executable instructions for performing the acts and/or events of the various methods.

In addition, while a particular feature may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

What is claimed is:

1. A system that facilitates re-ranking search results retrieved by a search engine, comprising one or more computers configured with:
    a query log component that, responsive to a target query, builds a language model specific to the target query based on queries stored in a query log of a search engine, the query log component comprising:
        a compilation module that determines absolute frequencies of search terms corresponding to the queries related lexically including a number of queries submitted by users that include the target query, and
        a session module that determines relative frequencies of the queries related temporally and submitted during a user session;
    a matching component that compares a lexical property of an initial search result for the target query and the language model and computes a match score that indicates a probability that two or more search results are related by utilizing a cosine similarity and a KL-divergence for comparing;
    a ranking component that re-ranks a subset of the initial search result based on the match score and a rank of the initial search result, wherein the re-ranking of the subset of the initial search result comprises processing a URL, one or more page titles, a plurality of page content and a plurality of snippets resulting from a document query pairing, and further wherein, the plurality of snippets are search-engine dependent;
    a user control selection component that allows a user to further re-rank the initial search result, wherein the user control selection component is configured to accept user input to manually control the further re-ranking of the initial search result; and
    a user control component that applies a selectable modification to at least one of the system components to change the re-ranking of the subset of the initial search result and the selectable modification is one of an increase in a diversity of top re-ranked search results and a decrease in the diversity of the top re-ranked search results.

2. The system of claim 1, the query log component utilizes at least one of a temporal similarity measure and a lexical similarity measure of the target query and the queries stored in the query log.

3. The system of claim 1, the diversity of the top re-ranked search results is controlled by an iterative re-ranking scheme in which one search result is selected to be added to the re-ranked results in each iteration and a discounting scheme is applied to the language model to decrease a similarity of the language model to the selected search result.

4. The system of claim 1, the query log component utilizes the absolute frequencies and the relative frequencies of the queries in the query log to derive the language model.

5. The system of claim 1, the language model is a probability distribution over query terms extracted from the queries in the query log.

6. The system of claim 5, the query terms are extracted from at least one of a set of queries that contain the target query as a substring, a set of queries that have a large lexical overlap with the target query, a set of queries that preceded the target query in a user search session, and a set of queries that followed the target query in a user search session.

7. The system of claim 1, the matching component uses the language model to assign the match score to a search result based on how the search result matches at least one of: a title of a document returned as the search result, a text of the document, a URL, a snippet generated by the search engine for a document query pair.

8. A method for providing relevant information based on an initial query, comprising using one or more processors to perform the following computer-executable acts:
receiving an initial set of ranked search results in response to the initial query;
responsive to the initial query, using a query log to build a query-specific language model for the initial query, the query log comprising a compilation module that determines absolute frequencies of search terms corresponding to queries lexically related, including a number of queries submitted by users that contain a target query search term, and a session module that determines relative frequencies of temporally related queries submitted during a user session;
comparing the language model with a lexical property of the initial set of ranked search results to compute a match score that indicates a probability that two or more search results are related by utilizing a cosine similarity and a KL-divergence for comparing;
re-ranking the initial set of ranked search results based on the match score, wherein the re-ranking of the initial set of ranked search results comprises processing a URL, one or more page titles, a plurality of page content and a plurality of snippets resulting from a document query pairing, and further wherein, the plurality of snippets are search-engine dependent;
receiving a user input to further re-rank the initial set of ranked search results, wherein the user input manually controls the further re-ranking of the initial set of ranked search results; and
the further re-ranking of the initial set of ranked search results comprising one of: increasing a diversity of the re-ranked search results and decreasing the diversity of the re-ranked search results and increasing or decreasing the diversity of the re-ranked search results is based on a received user-selectable criteria.

9. The method of claim 8, building the language model for the initial query is based on the temporally related queries.

10. The method of claim 8, building the language model for the initial query is based on the lexically related queries.

11. The method of claim 8, further comprising utilizing an iterative and a discounting scheme to control the diversity of the re-ranked search results.

12. The method of claim 8, building the language model comprising utilizing a frequency of queries in the query log.

13. A computer-readable storage medium including instructions to perform a method that comprises:
receiving an initial set of search results from a target query;
analyzing properties of the initial set of search results;
comparing the properties of the initial set of search results with at least one property of another set of search results to compute a match score by utilizing a cosine similarity and a KL-divergence;
re-ranking of the initial set of search results based on the compared properties of the initial set of search results and the another set of search results, the providing a re-ranking including applying a weighting factor to queries temporally adjacent to the target query and to extensions of the target query, wherein the re-ranking of the initial set of ranked search results comprises processing a URL, one or more page titles, a plurality of page content and a plurality of snippets resulting from a document query pairing, and further wherein, the plurality of snippets are search-engine dependent;
outputting a modified set of search results and the re-ranking;
applying a user input interactively to increase a diversity of the modified set of search results or decrease the diversity of the modified set of search results;
assigning a ranking score to the queries temporally adjacent to the target query and another ranking score to the extensions of the target query;
summing the ranking score and the another ranking score to form a sum; and
dividing the sum by an initial document ranking, to bias the re-ranking toward the initial document ranking.

14. The computer-readable storage medium of claim 13, the method further comprising:
selectively receiving a modification to the re-ranking; and
tailoring the re-ranking based on the received modification.

15. The computer-readable storage medium of claim 13, the method further comprising comparing the initial set of search results with the another set of search results applies one of a temporal comparison and a lexical comparison.

16. A method comprising using one or more processors to perform the following computer-executable acts:
receiving a target query input to a search engine;
obtaining search results of the target query;
obtaining at least two sources of information from a query log component, a first source being compilation data from search query input from a plurality of users and a second source being session data obtained during a user session;
analyzing the compilation data to obtain queries that are related lexically;
determining an absolute frequency of the lexically-related queries corresponding to a number of queries that include the target query submitted by the plurality of users;
analyzing the session data to obtain queries that are related temporally;
aggregating the analyzed session data with analyzed session data from other user sessions;
determining an occurrence rate of the temporally-related queries across the aggregated user sessions;
extracting query terms from a set of queries including queries that contain the target query as a substring, queries that have a large lexical overlap with the target query, queries that preceded the target query in the user session, and queries that followed the target query in the user session;
creating a query-specific language model for the target query based on the extracted query terms, the query-specific language model derived from the absolute frequency of the lexically-related queries and the occurrence rate of the temporally-related queries across the aggregated user sessions;

comparing the query-specific language model to a language model for every search result of the search results, the comparing utilizing a cosine similarity and a KL-divergence;

re-ranking the search results based on a result of the comparing, wherein the re-ranking of the search results comprises processing a URL, one or more page titles, a plurality of page content and a plurality of snippets resulting from a document query pairing, and further wherein, the plurality of snippets are search-engine dependent; and receiving a user input to further re-rank the search results, wherein the user input manually controls the further re-ranking of the search results;

outputting a final re-ranked search results to a user; and interactively providing the user input to change a ranking of the final re-ranked search results to increase or decrease a diversity of the final re-ranked search results.

* * * * *